(12) United States Patent
Ogura

(10) Patent No.: US 11,252,368 B2
(45) Date of Patent: Feb. 15, 2022

(54) PHOTOELECTRIC CONVERSION ELEMENT AND IMAGING DEVICE

(71) Applicant: CANON KABUSHIKI KAISHA, Tokyo (JP)

(72) Inventor: Masanori Ogura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 16/701,008

(22) Filed: Dec. 2, 2019

(65) Prior Publication Data

US 2020/0186737 A1 Jun. 11, 2020

(30) Foreign Application Priority Data

Dec. 6, 2018 (JP) .............................. JP2018-229118

(51) Int. Cl.
*H04N 5/378* (2011.01)
*H04N 7/18* (2006.01)
*H04N 1/028* (2006.01)
*H04N 5/357* (2011.01)

(52) U.S. Cl.
CPC ......... *H04N 5/378* (2013.01); *H04N 1/02815* (2013.01); *H04N 5/357* (2013.01); *H04N 7/18* (2013.01)

(58) Field of Classification Search
CPC .............................. H04N 5/357; H04N 5/361
See application file for complete search history.

(56) References Cited

U.S. PATENT DOCUMENTS

| 6,303,951 B1 | 10/2001 | Sawada |
| 7,227,208 B2 | 6/2007 | Ogura |
| 7,321,110 B2 | 1/2008 | Okita |
| 7,408,210 B2 | 8/2008 | Ogura |
| 7,456,880 B2 | 11/2008 | Okita |
| 7,460,162 B2 | 12/2008 | Koizumi |
| 7,514,732 B2 | 4/2009 | Okita |
| 7,550,793 B2 | 6/2009 | Itano |

(Continued)

FOREIGN PATENT DOCUMENTS

| JP | 2000-299760 | 10/2000 |
| JP | 2014-86873 | 5/2014 |

OTHER PUBLICATIONS

U.S. Appl. No. 16/780,468, filed Feb. 3, 2020, by Masanori Ogura.

*Primary Examiner* — Jerry T Jean Baptiste
(74) *Attorney, Agent, or Firm* — Venable LLP

(57) ABSTRACT

A photoelectric conversion element includes pixels that receive light and each generate charge in response to light incidence. The pixels include a first pixel that performs a first readout operation to read a reset signal and an optical signal and a second pixel on which a readout operation is performed at the same time as that of the first pixel and that performs selectively either the first readout operation or a second readout operation to read the reset signal. The photoelectric conversion element further includes, in association with each pixel, a first holding unit that holds the reset signal and the optical signal, and a first switch that controls writing to the first holding unit. A control line that controls the first switch associated with the first pixel and a control line that controls the first switch associated with the second pixel are formed of separate wirings.

21 Claims, 19 Drawing Sheets

(56) References Cited

U.S. PATENT DOCUMENTS

| | | |
|---|---|---|
| 7,605,415 B2 | 10/2009 | Koizumi |
| 7,629,568 B2 | 12/2009 | Koizumi |
| 7,638,826 B2 | 12/2009 | Hiyama |
| 7,679,658 B2 | 3/2010 | Sakurai |
| 7,719,587 B2 | 5/2010 | Ogura |
| 7,808,537 B2 | 10/2010 | Fujimura |
| 7,812,873 B2 | 10/2010 | Hiyama |
| 7,812,876 B2 | 10/2010 | Hiyama |
| 7,906,755 B2 | 3/2011 | Koizumi |
| 7,907,196 B2 | 3/2011 | Ogura |
| 7,943,975 B2 | 5/2011 | Koizumi |
| 7,948,540 B2 | 5/2011 | Ogura |
| 7,978,241 B2 | 7/2011 | Koizumi |
| 8,053,718 B2 | 11/2011 | Koizumi |
| 8,063,958 B2 | 11/2011 | Okita |
| 8,134,190 B2 | 3/2012 | Okita |
| 8,169,525 B2 | 5/2012 | Ryoki |
| 8,174,600 B2 | 5/2012 | Ogura |
| 8,207,561 B2 | 6/2012 | Koizumi |
| 8,218,050 B2 | 7/2012 | Ogura |
| 8,390,708 B2 | 3/2013 | Koizumi |
| 8,411,178 B2 | 4/2013 | Ogura |
| 8,416,329 B2 | 4/2013 | Hiyama |
| 8,441,558 B2 | 5/2013 | Okita |
| 8,477,224 B2 | 7/2013 | Ogura |
| 8,493,487 B2 | 7/2013 | Takada |
| 8,520,102 B2 | 8/2013 | Ogura |
| 8,520,108 B2 | 8/2013 | Ogura |
| 8,552,481 B2 | 10/2013 | Hiyama |
| 8,624,307 B2 | 1/2014 | Koizumi |
| 8,698,935 B2 | 4/2014 | Okita |
| 8,749,675 B2 | 6/2014 | Koizumi |
| 8,823,849 B2 | 9/2014 | Hiyama |
| 8,896,029 B2 | 11/2014 | Koizumi |
| 8,928,790 B2 | 1/2015 | Ogura |
| 9,124,830 B2 | 9/2015 | Ogura |
| 9,231,022 B2 | 1/2016 | Hiyama |
| 9,305,954 B2 | 4/2016 | Kato |
| 9,595,559 B2 | 3/2017 | Hiyama |
| 10,225,496 B2 | 3/2019 | Ogura |
| 2012/0181590 A1 | 7/2012 | Okita |
| 2013/0140467 A1* | 6/2013 | Kitano ............ H01L 27/14676 250/393 |
| 2014/0375859 A1* | 12/2014 | Ono ............ H04N 5/378 348/308 |
| 2016/0005788 A1* | 1/2016 | Ogura ............ H01L 27/14612 257/229 |
| 2017/0133417 A1 | 5/2017 | Hiyama |
| 2017/0237915 A1* | 8/2017 | Ogura ............ H04N 5/3651 348/248 |

\* cited by examiner

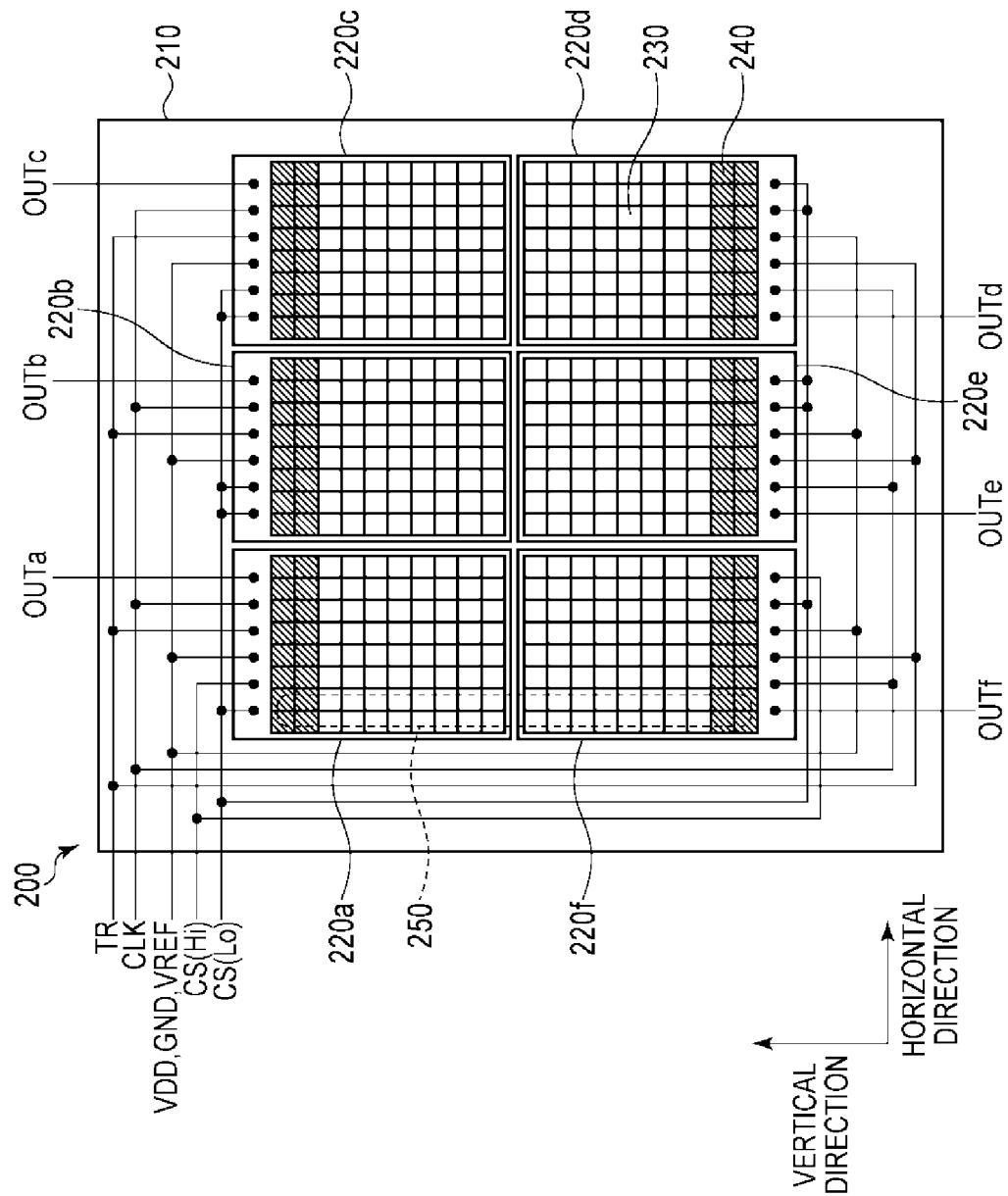

PHOTOELECTRIC CONVERSION ELEMENT AND IMAGING DEVICE

BACKGROUND OF THE INVENTION

Field of the Invention

The present invention relates to a photoelectric conversion element and an imaging device.

Description of the Related Art

Japanese Patent Application Laid-Open No. 2000-299760 and Japanese Patent Application Laid-Open No. 2014-086873 disclose an imaging device in which a plurality of imaging elements are arranged one-dimensionally or two-dimensionally in order to obtain a large area of an imaging region. In Japanese Patent Application Laid-Open No. 2000-299760 and Japanese Patent Application Laid-Open No. 2014-086873, to increase manufacturing efficiency, an imaging device is formed to have a large area of an imaging region by arranging imaging elements having the same configuration.

However, when the number of imaging elements arranged for increasing the area of the imaging region is increased and three or more imaging elements are aligned in the vertical direction or the horizontal direction or three or more imaging elements are aligned in both the vertical and horizontal directions, it is not possible to output an optical signal of an effective pixel and a dark signal of an optical black pixel within the same sequence. That is, when three or more imaging elements each arranged with the optical black pixel are aligned in at least one direction, the optical black pixels are arranged in a boundary portion of the imaging elements, and image quality of the boundary portion decreases. Further, without the optical black pixel being arranged, it is not possible to obtain a reference signal used for subtracting black noise superimposing commonly on the effective pixel. As a result, image quality deterioration caused by emphasis and suppression of the black level of an image obtained from the imaging device or image quality deterioration due to stripe noise occurring within a sequence may occur.

SUMMARY OF THE INVENTION

The present invention intends to provide a photoelectric conversion element and an imaging device that can acquire a good quality image on which the black level of the image has been adjusted or stripe noise has been removed without arranging an optical black pixel in an effective imaging region when a plurality of imaging elements are arranged to form an imaging region.

According to one aspect of the present invention, provided is a photoelectric conversion element including a plurality of pixels arranged to receive a light and each including a photoelectric converter that generates charge in response to incidence of a light. The plurality of pixels includes a first pixel configured to perform a first readout operation to read out a reset signal based on the photoelectric converter in a reset state and an optical signal based on charge generated by the photoelectric converter and a second pixel that is a pixel on which a readout operation is performed at the same time as that of the first pixel and is configured to perform selectively either one of the first readout operation to read out the reset signal and the optical signal and a second readout operation to read out the reset signal without reading out the optical signal. The photoelectric conversion element further includes, in association with each of the plurality of pixels, a first holding unit that holds the reset signal and the optical signal, and a first switch that controls writing to the first holding unit, and a control line that controls the first switch associated with the first pixel and a control line that controls the first switch associated with the second pixel are formed of separate wirings.

Further features of the present invention will become apparent from the following description of exemplary embodiments with reference to the attached drawings.

BRIEF DESCRIPTION OF THE DRAWINGS

FIG. 15 is a schematic diagram illustrating a configuration example of an imaging device according to a fourth embodiment of the present invention.

DESCRIPTION OF THE EMBODIMENTS

Preferred embodiments of the present invention will now be described in detail in accordance with the accompanying drawings.

First Embodiment

An image reading apparatus according to a first embodiment of the present invention will be described with reference to FIG. 1 to FIG. 7B.

Figure 1:
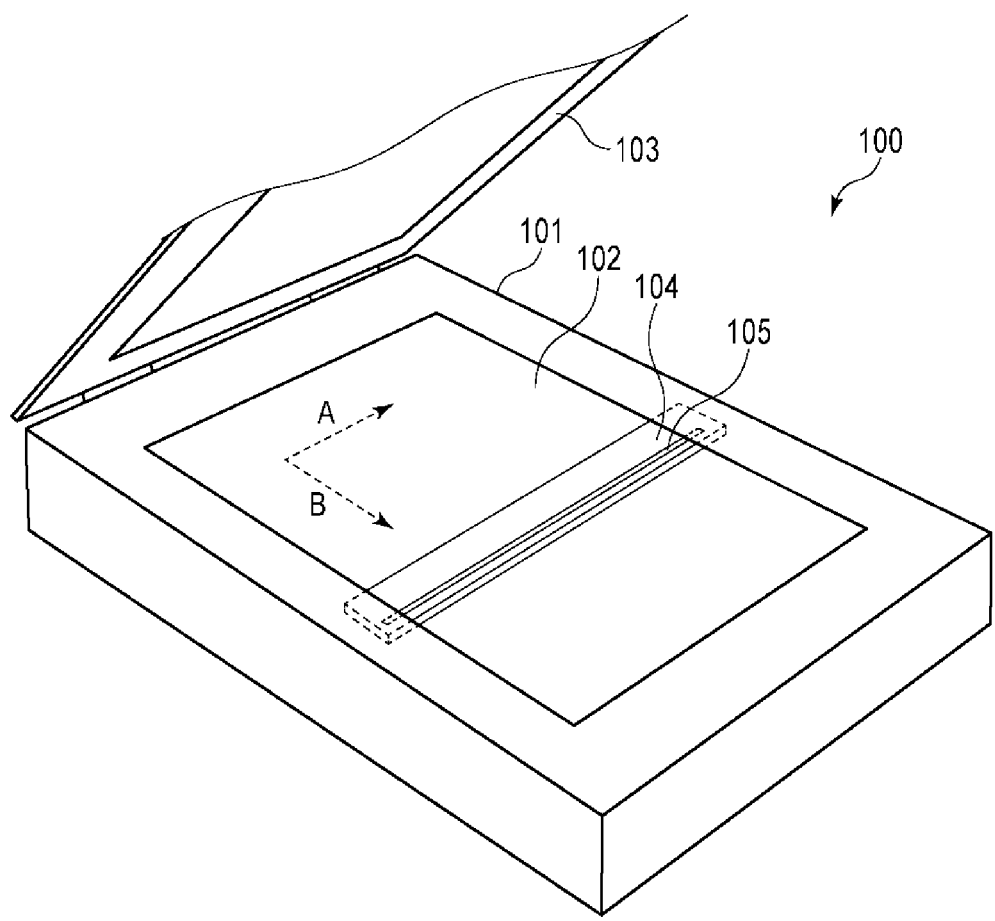
FIG. 1 is a perspective view illustrating a general configuration of an image reading apparatus according to a first embodiment of the present invention.

FIG. 1 is a perspective view illustrating a general configuration of an image reading apparatus according to the present embodiment. As illustrated in FIG. 1, an image reading apparatus 100 according to the present embodiment includes an apparatus main body 101 and a document cover 103. FIG. 1 illustrates a perspective external view of the image reading apparatus 100 with the document cover 103 opened.

A transparent plate 102 is attached on the top face of the apparatus main body 101 as a document stage used for placing a document. The transparent plate 102 may be formed of a glass plate, for example. A document to be read is placed on the transparent plate 102 such that an image face to be read is in contact with the transparent plate 102. The document cover 103 is configured to function as a pressing member used for pressing the document placed on the transparent plate 102 against the top face of the transparent plate 102 and is attached to the apparatus main body 101 so as to be able to opened and closed.

An imaging device 104 is provided inside the apparatus main body 101. The imaging device 104 includes a plurality of imaging elements 105 mounted so as to align in the direction of the arrow A. Note that mounting a plurality of imaging elements 105 so as to align in such a way is also referred to as tiling. The imaging device 104 can capture a document placed on the transparent plate 102 in a two-dimensional manner by moving along the direction of the arrow B. In such an image reading apparatus, the direction of the arrow B in which the imaging device 104 or the document moves is referred to as a sub-scanning direction, and the direction of the arrow A orthogonal to the sub-scanning direction is referred to as a main scanning direction. A configuration example of the apparatus main body 101 will be described later in a fifth embodiment.

Figure 2:
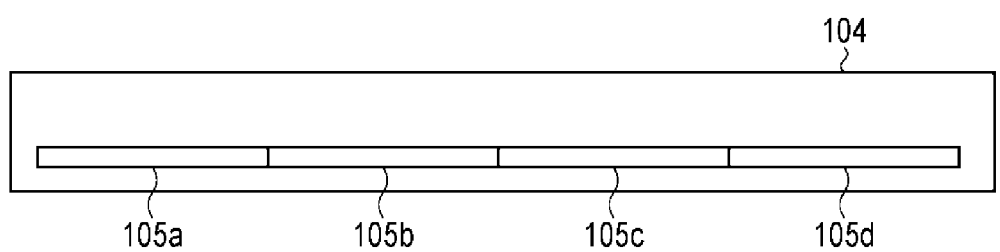
FIG. 2 is a schematic diagram illustrating a configuration example of an imaging device in the image reading apparatus according to the first embodiment of the present invention.

FIG. 2 is a schematic diagram illustrating a configuration example of the imaging device 104. As illustrated in FIG. 2, the imaging device 104 includes a plurality of imaging elements 105 mounted so as to align in the direction of the arrow A. The width in the direction of the arrow A in which the plurality of imaging elements 105 are aligned corresponds to the width of a document that can be read. While the imaging device 104 formed of four imaging elements 105a, 105b, 105c, and 105d is illustrated here as one example, the number of the imaging elements 105 forming the imaging device 104 is not particularly limited and may be appropriately increased or decreased. Note that, in view of increasing manufacturing efficiency of the imaging device 104, it is desirable that a plurality of imaging elements 105 mounted in one imaging device 104 be imaging elements having the same configuration.

Figure 3:
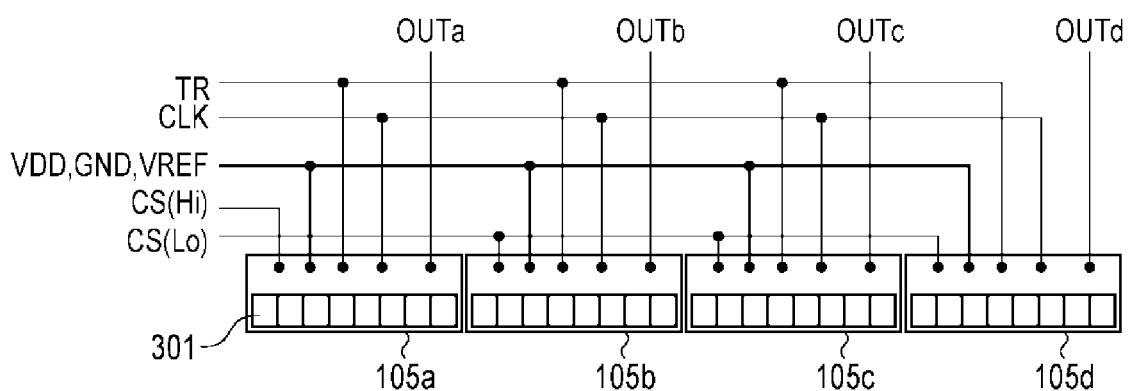
FIG. 3 is a diagram illustrating input and output signals for the imaging device in the image reading apparatus according to the first embodiment of the present invention.

FIG. 3 is a diagram illustrating input and output signals to the imaging elements 105a to 105d of the imaging device 104. As illustrated in FIG. 3, a power supply voltage VDD, a ground voltage GND, a reference voltage VREF, a trigger signal TR, a reference clock signal CLK, and a control signal CS are supplied to the imaging device 104, for example. Further, output signals OUTa, OUTb, OUTc, and OUTd are output from the imaging device 104.

The power supply voltage VDD, the ground voltage GND, the reference voltage VREF, the trigger signal TR, the reference clock signal CLK, and the control signal CS are supplied to each of the imaging elements 105a to 105d via a common wiring, respectively.

The control signal CS is not a common control signal for all the imaging elements 105a to 105d. The operation of the imaging element 105 can be switched in accordance with the level of the control signal CS input to the CS terminal of the imaging element 105. In the present embodiment, the control signal CS at a Hi level (High level) is supplied to the CS input terminal of the imaging element 105a that is mounted on the starting point side in the main scanning direction. The control signal CS at a Lo level (Low level) is supplied to the CS input terminals of the other imaging elements 105b, 105c, and 105d. That is, the operation of the imaging element 105a in which the control signal CS input to the CS input terminal is at the Hi level is different from those of the imaging elements 105b, 105c, and 105d in which the control signals CS input to the CS input terminals are at the Lo level.

Figure 4:
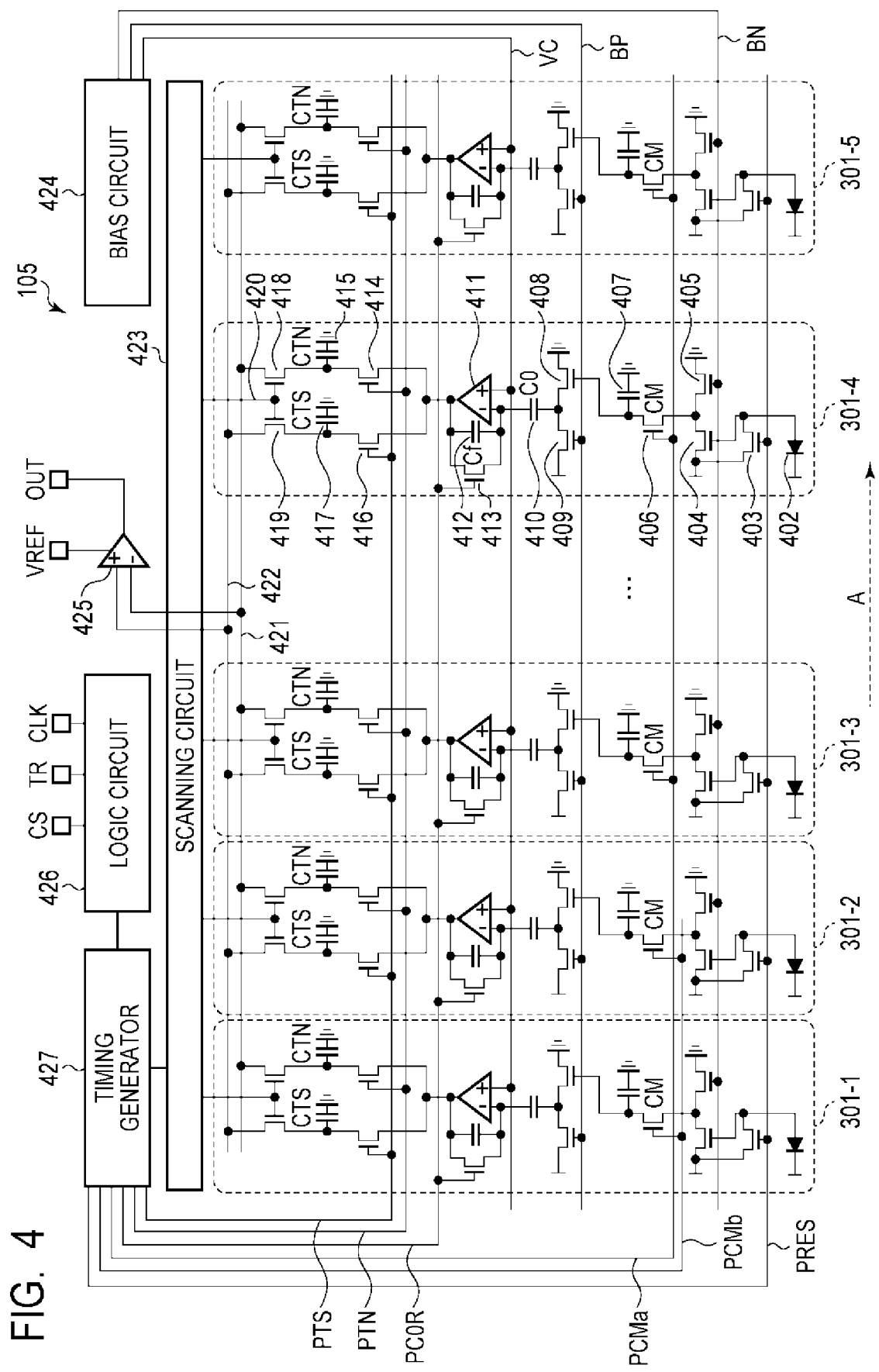
FIG. 4 is a circuit diagram illustrating a configuration example of an imaging element in the image reading apparatus according to the first embodiment of the present invention.

FIG. 4 is a circuit diagram illustrating a configuration example of the imaging element 105. Note that all the imaging elements 105 (the imaging elements 105a to 105d) included in one imaging device 104 have the same configuration.

As illustrated in FIG. 4, the imaging element 105 includes a plurality of unit pixels 301, a scanning circuit 423, a bias circuit 424, a readout amplifier 425, a logic circuit 426, and a timing generator 427. The plurality of unit pixels 301 are arranged so as to align in the main scanning direction (the direction of the arrow A). While the imaging element 105 including unit pixels 301-1, 301-2, 301-3, . . . , 301-4, and 301-5 is illustrated here as one example, the number of unit pixels 301 forming one imaging element 105 is not particularly limited and may be appropriately increased or decreased.

Each of the unit pixels 301 includes a photoelectric converter 402, MOS transistors 403, 404, 405, 406, 408, 409, 413, 414, 416, 418, and 419, capacitors 407, 410, 412, 415, and 417, and an operational amplifier 411.

The photoelectric converter 402 is a photodiode, for example. The cathode of the photodiode forming the photoelectric converter 402 is connected to the power supply voltage node. The anode of the photodiode is connected to the drain of the MOS transistor 403 forming a reset transistor and the gate of the MOS transistor 404 forming an NMOS source follower. The source of the MOS transistor 403 and the drain of the MOS transistor 404 are connected to the power supply voltage node. The source of the MOS transistor 404 is connected to the drain of the MOS transistor 405 forming the constant current source. The source of the MOS transistor 405 is connected to the ground voltage node.

The connection node between the source of the MOS transistor 404 and the drain of the MOS transistor 405 is connected to the source of the MOS transistor 406 forming a switch. The drain of the MOS transistor 406 is connected to one terminal of the capacitor 407 having a capacitance value CM and the gate of the MOS transistor 408 forming a PMOS source follower. The drain of the MOS transistor 408 and the other terminal of the capacitor 407 are connected to the ground voltage node. The source of the MOS transistor 408 is connected to the drain of the MOS transistor 409 forming the constant current source. The source of the MOS transistor 409 is connected to the power supply voltage node. The connection node between the source of the MOS transistor 408 and the drain of the MOS transistor 409 is connected to one terminal of the capacitor 410 forming an input capacitor having a capacitance value C0.

The other terminal of the capacitor 410 is connected to an inverting input terminal of the operational amplifier 411. The capacitor 412 forming a feedback capacitor having a capacitance value Cf and the MOS transistor 413 forming a switch are connected in parallel between an inverting input terminal and the output terminal of the operational amplifier 411. The drain of the MOS transistor 414 forming a switch and the drain of the MOS transistor 416 also forming a switch are connected to the output terminal of the operational amplifier 411.

One terminal of the capacitor 415 (CTN) and the drain terminal of the MOS transistor 418 forming a switch are connected to the source of the MOS transistor 414. One terminal of the capacitor 417 (CTS) and the drain terminal of the MOS transistor 419 forming a switch are connected to the source of the MOS transistor 416. The other terminals of the capacitors 415 and 417 are connected to the ground voltage node. The gates of the MOS transistors 418 and 419 are connected to the scanning circuit 423 via a control line 420.

The bias circuit 424 is a circuit unit that supplies a predetermined bias voltage to the MOS transistors 405 and 409 and the operational amplifier 411 of each of the unit pixels 301-1, 301-2, 301-3, . . . , 301-4, and 301-5.

Each gate of the MOS transistors 405 of the unit pixels 301-1, 301-2, 301-3, . . . , 301-4, and 301-5 is connected to a common signal line and supplied with a bias voltage BN from the bias circuit 424.

Each gate of the MOS transistors 409 of the unit pixels 301-1, 301-2, 301-3, . . . , 301-4, and 301-5 is connected to a common signal line and supplied with a bias voltage BP from the bias circuit 424.

Each non-inverting input terminal of the operational amplifiers 411 of the unit pixels 301-1, 301-2, 301-3, . . . , 301-4, and 301-5 is connected to a common signal line and supplied with a bias voltage VC from the bias circuit 424.

The timing generator 427 is a control unit that supplies control signals used for controlling the MOS transistors 403, 406, 413, 414, and 416 of the unit pixels 301-1, 301-2, 301-3, . . . , 301-4, and 301-5.

Each gate of the MOS transistors 403 of the unit pixels 301-1, 301-2, 301-3, . . . , 301-4, and 301-5 is connected to a common signal line and supplied with a control signal PRES from the timing generator 427.

Each gate of the MOS transistors 406 of the unit pixels 301-3, . . . , 301-4, and 301-5 is connected to a common signal line and supplied with a control signal PCMa from the timing generator 427. Further, each gate of the MOS transistors 406 of the unit pixels 301-1 and 301-2 is connected to a common signal line and supplied with a control signal PCMb from the timing generator 427.

Each gate of the MOS transistors 413 of the unit pixels 301-1, 301-2, 301-3, . . . , 301-4, and 301-5 is connected to a common signal line and supplied with a control signal PCOR from the timing generator 427.

Each gate of the MOS transistors 414 of the unit pixels 301-1, 301-2, 301-3, . . . , 301-4, and 301-5 is connected to a common signal line and supplied with a control signal PTN from the timing generator 427. Further, each gate of the MOS transistors 416 of the unit pixels 301-1, 301-2, 301-3, . . . , 301-4, and 301-5 is connected to a common signal line and supplied with a control signal PTS from the timing generator 427.

Each source of the MOS transistors 418 of the unit pixels 301-1, 301-2, 301-3, . . . , 301-4, and 301-5 is connected to a CHN line 421. Each source of the MOS transistors 419 of the unit pixels 301-1, 301-2, 301-3, . . . , 301-4, and 301-5 is connected to a CHS line 422. The CHN line 421 and the CHS line 422 are connected to the input terminal of the readout amplifier 425. The reference voltage VREF is supplied to the readout amplifier 425 from the outside of the imaging element 105 via a VREF terminal. The readout amplifier 425 forms an output unit that outputs the reference voltage VREF plus the difference between a signal output to the CHN line 421 and a signal output to the CHS line 422. The output terminal of the readout amplifier 425 is connected to an OUT terminal.

To the logic circuit 426, a control signal CS is supplied via a CS terminal, the trigger signal TR is supplied via a TR terminal, and the reference clock signal CLK is supplied via a CLK terminal, respectively, from the outside of the imaging element 105.

Figure 5:
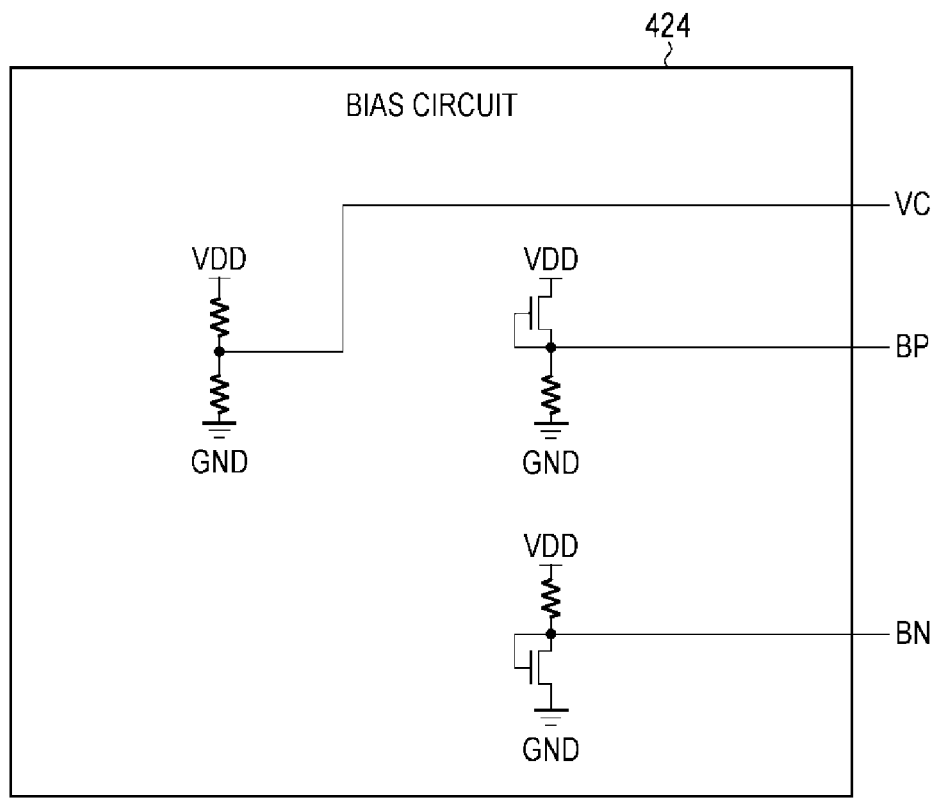
FIG. 5 is a schematic diagram illustrating a configuration example of a bias circuit of the imaging element in the image reading apparatus according to the first embodiment of the present invention.

FIG. 5 is a circuit diagram illustrating a configuration example of the bias circuit 424. The bias circuit 424 includes a generation circuit of the bias voltage VC, a generation circuit of the bias voltage BN, and a generation circuit of the bias voltage BP. As illustrated in FIG. 5, the bias voltage VC can be generated by a resistor-divided voltage using a series connection of resistor elements provided between the power supply voltage node and the ground voltage node, for example. As illustrated in FIG. 5, the bias voltage BN can be generated by a bias circuit using an n-channel MOS transistor and a resistor element provided between the power supply voltage node and the ground voltage node, for example. As illustrated in FIG. 5, the bias voltage BP can be generated by a bias circuit using a p-channel MOS transistor and a resistor element provided between the power supply voltage node and the ground voltage node, for example. As described above, the bias voltages VC, BN, and BP may be generated from the power supply voltage VDD and the ground voltage GND supplied to all the imaging elements 105a to 105d via the common wiring.

Figure 6:
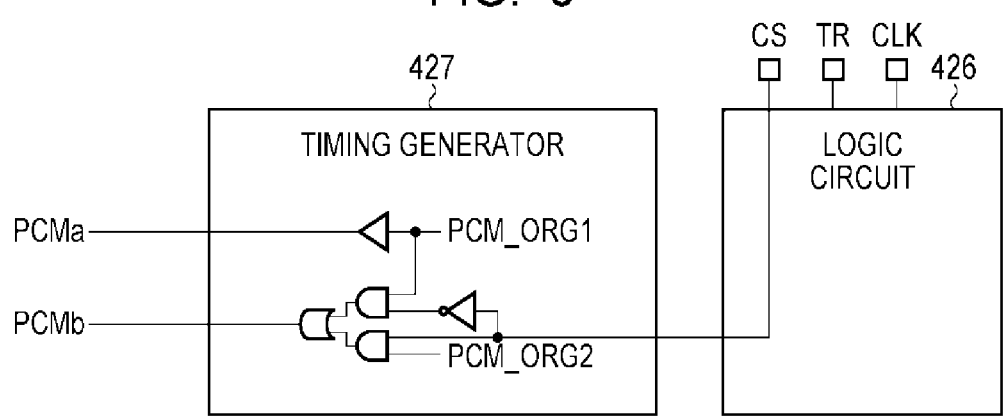
FIG. 6 is a schematic diagram illustrating a configuration example of a logic circuit and a timing generator of the imaging element in the image reading apparatus according to the first embodiment of the present invention.

FIG. 6 is a circuit diagram illustrating a configuration example of the logic circuit 426 and the timing generator 427. FIG. 6 illustrates only a portion related to the generation of the control signals PCMa and PCMb out of the circuits forming the logic circuit 426 and the timing generator 427.

The timing generator 427 starts an internal operation in response to the trigger signal TR being input via the TR terminal and counts the reference clock signal CLK input from the CLK terminal. The timing generator 427 then generates control signals PCM_ORG1 and PCM_ORG2, which are internally generated signals, at a predetermined timing after the trigger signal TR is input. Subsequently, based on the control signal CS supplied from the CS terminal and the control signals PCM_ORG1 and PCM_ORG2, the timing generator 427 generates the control signals PCMa and PCMb.

Specifically, when the Lo-level control signal CS is input from the CS terminal, the timing generator 427 outputs the control signals PCM_ORG1 as both the control signals PCMa and PCMb. On the other hand, when the Hi-level control signal CS is input from the CS terminal, the timing generator 427 outputs the control signal PCM_ORG1 as the control signal PCMa and the control signal PCM_ORG2 as the control signal PCMb. The logic circuit that performs such logic calculation is not particularly limited and can be realized by a logic circuit illustrated in FIG. 6, for example.

Figure 7A:
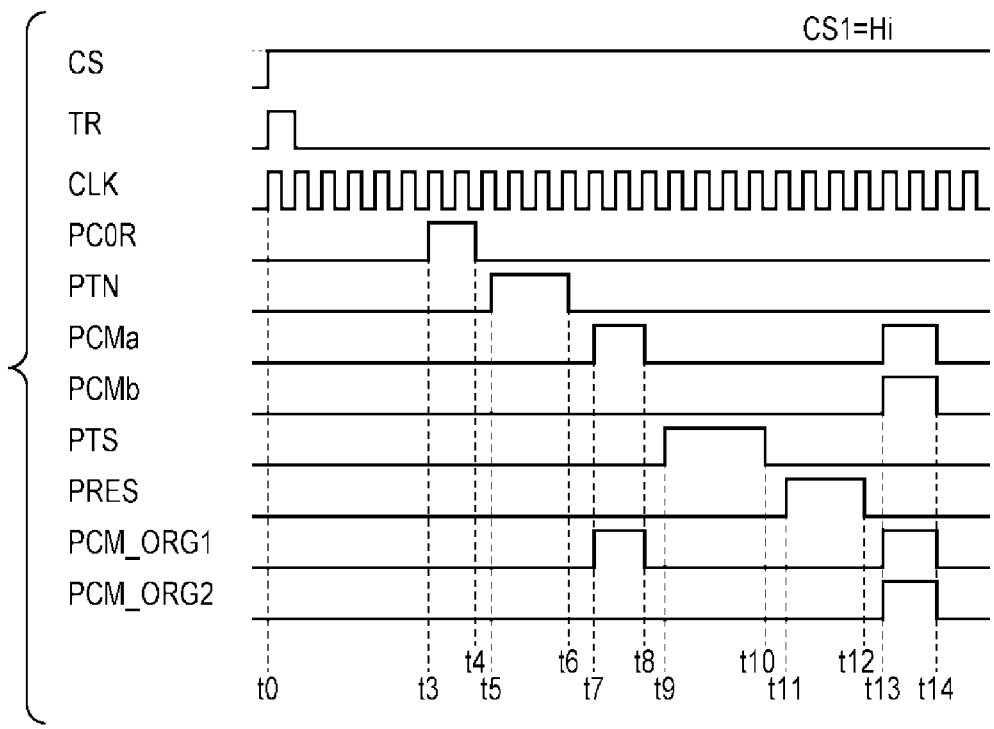
FIG. 7A and FIG. 7B are timing diagrams illustrating operation examples of the imaging element in the image reading apparatus according to the first embodiment of the present invention.
Figure 7B:
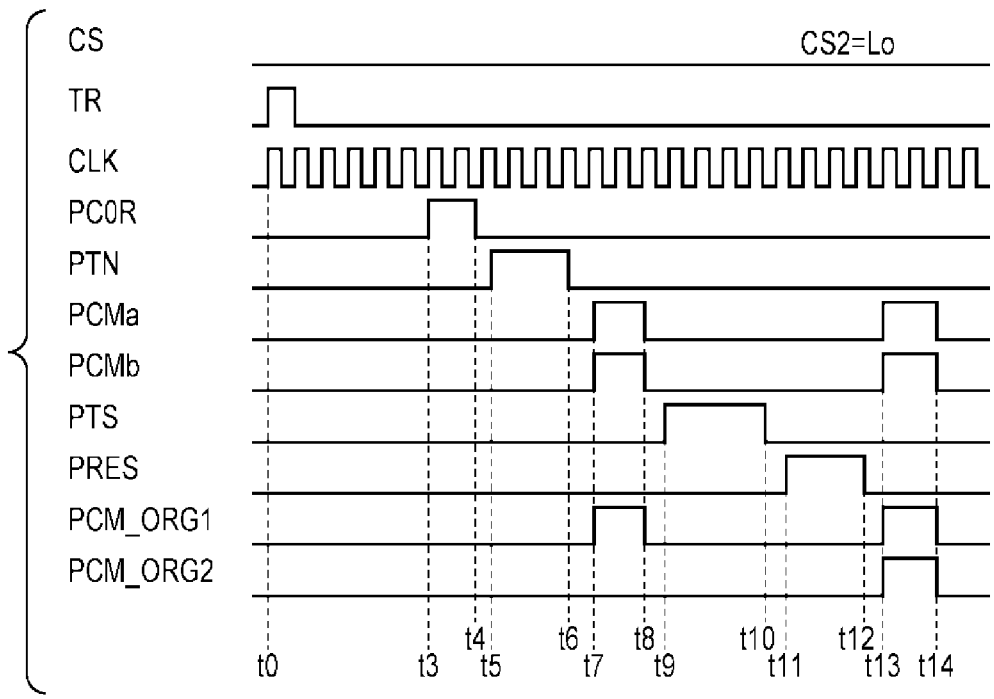

Next, the operation of the imaging element in the image reading apparatus according to the present embodiment will be described with reference to FIG. 7A and FIG. 7B. FIG. 7A and FIG. 7B are timing diagrams illustrating operation examples of the imaging element. FIG. 7A is the timing diagram illustrating the operation example of the imaging element 105a, and FIG. 7B is the timing diagram illustrating the operation example of the imaging elements 105b to 105d. In FIG. 7A and FIG. 7B, the control signal CS, the trigger signal TR, the reference clock signal CLK, the control signals PCOR, PTN, PCMa, PCMb, PTS, PRES, PCM_ORG1, and PCM_ORG2 are illustrated as the signals used for driving the imaging element 105.

The unit pixels 301 of the imaging elements 105a to 105d include a common signal line that supplies the control signals PCOR, PTN, PTS, and PRES and are simultaneously driven by these control signals. At this time, the control signals PCMa and PCMb are selectively supplied to the predetermined unit pixel 301.

First, the operation of the imaging element 105a will be described with reference to FIG. 7A. While the operation of the imaging element 105a is performed based on the input of the trigger signal TR as a reference, the operation from time t11 illustrated in FIG. 7A will be described for convenience of the illustration here. Note that, after the trigger signal TR is input and then a certain number of reference clock signals CLK are input, the operation of the imaging element 105 returns to the input of the trigger signal TR. The image reading apparatus 100 moves the imaging device 104 by a predetermined distance in the sub-scanning direction immediately before the next trigger signal TR is input. The image reading is performed by repeating the above sequence.

As described above, the Hi-level control signal CS (CS1) is supplied to the imaging element 105a. Therefore, as described with reference to FIG. 6, the timing generator 427 outputs the control signal PCM_ORG1 as the control signal PCMa and outputs the control signal PCM_ORG2 as the control signal PCMb. Here, the control signal PCM_ORG1 is a signal controlled to the Hi level in the period from time t7 to time t8 and the period from time t13 to time 14. Further, the control signal PCM_ORG2 is a signal controlled to the Hi level in the period from time t13 to time t14.

First, in the period from time t11 to time t12, the timing generator 427 controls the control signal PRES to the Hi level. Thereby, the MOS transistor 403 is turned on, and the photoelectric converter 402 is reset to a predetermined voltage VNpd corresponding to the power supply voltage. Further, the voltage VNpd in accordance with the photoelectric converter 402 at the reset state is input to the gate of the MOS transistor 404.

Subsequently, in the period from time t13 to time t14, the control signals PCM_ORG1 and PCM_ORG2 are controlled to the Hi level, and the timing generator 427 controls the control signals PCMa and PCMb to the Hi level. Thereby, the MOS transistor 406 is turned on, and the output (voltage VNcm) of an NMOS source follower (the MOS transistor 404) having the voltage VNpd as the input is written and held in the capacitor 407. The voltage VNcm is the reset signal (also called as, e.g., "noise signal") based on the photoelectric converter 402 in the reset state. Further, the voltage VNcm is input to the gate of the MOS transistor 408, and the output of the PMOS source follower (the MOS transistor 408) having the voltage VNcm as the input is a predetermined voltage in accordance with the voltage VNcm. Note that the capacitor 407 is a holding unit used for temporarily holding an optical signal (also called as, e.g., "photoelectric conversion signal" and "light signal") described below and the reset signal.

Subsequently, in the period from time t3 to time t4 in the next cycle, the timing generator 427 controls the control signal PCOR to the Hi level. Thereby, the MOS transistor 413 is turned on, and the input terminal and the output terminal of the operational amplifier 411 are initialized to the bias voltage VC.

Subsequently, in the period from time t5 to time t6, the timing generator 427 controls the control signal PTN to the Hi level. Thereby, the MOS transistor 414 is turned on, the voltage VNcm is input, and a voltage VNct output via the PMOS source follower, the operational amplifier 411, and the MOS transistor 414 is written and held in the capacitor 415. Note that the capacitor 415 is a holding unit used for holding a reset signal.

Here, to simplify the illustration, when it is assumed that the gain of each source follower is 1-fold and no offset difference occurs between input and output, the voltage VNpd is equal to the voltage VNcm, and the voltage VNct at all the unit pixels 301 of the imaging element 105a is expressed by Equation (1) below.

$$VNct = \frac{C0}{Cf} \times (VNpd - VC) \times VC \qquad (1)$$

Subsequently, in the period from time t7 to time t8, the control signal PCM_ORG1 is controlled to the Hi level, and the timing generator 427 controls the control signal PCMa to the Hi level. At this time, the control signal PCM_ORG2 is at the Lo level, and the control signal PCMb remains at the Lo level. Thereby, the MOS transistors 406 of the unit pixels 301-1 and 301-2 remain to be turned off, and the MOS transistors 406 of the unit pixels 301-3, . . . , 301-4, and 301-5 are turned on.

In the period from time t12 in the previous cycle to time t8, the photoelectric converter 402 generates and accumulates signal charge in accordance with an incident light amount. When an optical signal based on the signal charge has a voltage VSpd, in each unit pixels 310-3, ..., 301-4, and 301-5 in which the MOS transistor 406 is turned on, a voltage corresponding to the voltage (VNcm+VSpd) will be held in the capacitor 407. On the other hand, in each unit pixels 301-1 and 301-2 in which the MOS transistor 406 is tuned off, the voltage VNcm remains to be held in the capacitor 407.

Subsequently, in the period from time t9 to time t10, the timing generator 427 controls the control signal PTS to the Hi level. Thereby, the MOS transistor 416 is turned on, the voltage held by the capacitor 407 is input, and a voltage VSct output via the PMOS source follower, the operational amplifier 411, and the MOS transistor 416 is written and held in the capacitor 417. Note that the capacitor 417 is a holding unit used for holding an optical signal.

As a result, the voltage VSct expressed by Equation (2) below is held in the capacitors 417 of the unit pixels 301-1 and 301-2. The voltage VSct is the same as the voltage VNct held in the capacitor 415 (Equation (1)).

$$VSct = \frac{C0}{Cf} \times (VNpd - VC) + VC \quad (2)$$

Further, the voltage VSct expressed by Equation (3) described below is held in the capacitors 417 of the unit pixels 301-3, ..., 301-4, and 301-5.

$$VSct = \frac{C0}{Cf} \times (VNpd + VSpd - VC) + VC \quad (3)$$

The readout operations in which signals based on signal charge generated in the photoelectric converter 402 in the period from time t11 of the previous cycle to time t10 are read out to the capacitors 415 and 417 are performed in all the unit pixels 301 in parallel. The readout operations in which signals are read out from the capacitors 415 and 417 to the readout amplifier 425 are performed in the period from time t14 to time t3 of the next cycle sequentially on a unit pixel basis.

In the period from time t14 to time t3 in the next cycle, the scanning circuit 423 controls a control signal to be output to the control line 420 to the Hi level sequentially on a unit pixel 301 basis (not illustrated). Thereby, the MOS transistors 418 and 419 of the corresponding unit pixel 301 are turned on, the voltage VNct held in the capacitor 415 is read out to the CHN line 421, and the voltage VSct held in the capacitor 417 is read out to the CHS line 422.

In such a way, pixel signals serially read out to the CHN line 421 and the CHS line 422 are input to the readout amplifier 421. The readout amplifier 425 outputs, from the OUT terminal, the reference voltage VREF plus the difference between the voltage of the CHS line 422 and the voltage of the CHN line 421.

That is, an output voltage VOUT output from each OUT terminal of the unit pixels 301-1 and 301-2 is expressed as Equation (4) below.

$$VOUT = \left(\frac{C0}{Cf} \times (VNpd - VC) + VC\right) - \quad (4)$$

-continued $$\left(\frac{C0}{Cf} \times (VNpd - VC) + VC\right) + VREF$$

$$= VREF$$

Further, when the gain of the operational amplifier (C0/Cf) is assumed to be 1, the output voltage VOUT output from each OUT terminal of the unit pixels 301-3, ..., 301-4, and 301-5 is expressed as Equation (5) below.

$$VOUT = \left(\frac{C0}{Cf} \times (VNpd + VSpd - VC) + VC\right) - \quad (5)$$

$$\left(\frac{C0}{Cf} \times (VNpd - VC) + VC\right) + VREF$$

$$= Vspd + VREF$$

In such a way, in the imaging element 105a, by inputting the Hi-level control signal CS to the CS terminal, it is possible to obtain output signals which do not depend on the incident light amount from some unit pixels 301-1 and 301-2. Further, it is possible to obtain output signals in accordance with the incident light amount from the remaining unit pixels 301-3, ..., 301-4, and 301-5.

Next, the operation of the imaging elements 105b to 105d will be described with reference to FIG. 7B. As described above, the Lo-level control signal CS (CS2) is supplied to the imaging elements 105b to 105d. Therefore, as described with reference to FIG. 6, the timing generator 427 outputs the control signal PCM_ORG1 as the control signals PCMa and PCMb.

The operation of the imaging elements 105b to 105d is the same as the operation of the imaging element 105a illustrated in FIG. 7A except that the control signal PCMb is controlled to the Hi level in the period from time t7 to time t8 as illustrated in FIG. 7B.

That is, in the period from time t7 to time t8, the timing generator 427 controls the control signals PCMa and PCMb to the Hi level. Thereby, in all the unit pixels 301, the MOS transistors 406 are turned on, and the voltage corresponding to (VNcm+VSpd) in accordance with the incident light amount will be held in the capacitors 407.

Thereby, in the imaging elements 105b to 105d, by inputting the Lo level control signal CS to the CS terminal, it is possible to obtain output signals in accordance with the incident light amount from all the unit pixels 301.

In the operation of the imaging element 105 described above, the bias voltages BN, BP, and VC may temporally fluctuate in the period between a timing to read out a signal to the capacitor 415 and a timing to read out a signal to the capacitor 417. For example, due to a fluctuation of the power supply voltage or the ground voltage in accordance with a series of readout operations from time t11 to time t10 in the next cycle, the bias voltages BN, BP, and VC generated in the bias circuit of FIG. 5 may fluctuate.

Since the power supply voltage and the ground voltage are supplied to each of the imaging elements 105a to 105d via a common wiring in the imaging device 104, fluctuations in the bias voltages BN, BP, and VC occur in all the imaging elements 105a to 105d in the same tendency. When the bias voltages BN, BP, and VC fluctuate, similar offset components are evenly superimposed on the outputs of all the unit pixels 301 of the imaging elements 105a to 105d. Such an offset component is likely to cause stripe noise along the main scanning direction. Note that a ratio of an offset component with respect to the change amount of the power supply voltage or the ground voltage is referred to as a power supply rejection ratio (PSRR).

In a conventional imaging device that obtains a wider capturing range by tiling the imaging elements having the same structure, it is not possible to obtain a dark state output which does not depend on an incident light amount. This is because, when a light-shielded optical black pixel is arranged in an imaging element, when the imaging elements having the same structure are tiled, a pixel signal which does not depend on an incident light amount enters the effective imaging region.

It is desirable that a signal acquired from the optical black pixel for subtracting a signal offset or black noise of the imaging element be output in the same sequence as the optical signal of the effective pixel. The sequence here refers to an operation to read out a signal from the photoelectric converter of the imaging element to the outside. In acquisition of one image, the above sequence may be repeated for multiple times without being limited to be performed once. The optical black pixel refers to a light-shielded pixel and is often arranged adjacent to the vertical end or the horizontal end, or both the vertical end and the horizontal end of the effective imaging region of the imaging element. A signal read out from the optical black pixel is a dark signal which does not depend on an incident light amount of the imaging element. Therefore, the signal read out from the optical black pixel is used as a reference signal subtracted from an optical signal of the effective pixel arranged so as to receive light (not shielded from light) in order to subtract a signal offset or black noise of the imaging element.

When three or more imaging elements in which the optical black pixels are arranged are tiled in at least one direction to form an imaging device, the optical black pixels are arranged at the boundary of the tiled imaging elements, and thereby a failure occurs in the effective imaging region obtained as the imaging device. It is therefore not possible to arrange the optical black pixels in the imaging element to be tiled, and it is not possible to obtain a reference signal used for subtracting black noise that commonly appears in a plurality of tiled imaging elements forming the imaging device. As a result, it is not possible to correct image quality deterioration caused by emphasis and suppression of the black level of an image obtained from the imaging device or stripe noise along the main scanning direction, and as a result, image quality is deteriorated.

In this regard, in the present embodiment, even though the plurality of imaging elements 105a to 105d have the same configuration and have no optical black pixel, output signals which do not depend on an incident light amount can be obtained from some of the unit pixels 301. Since a stripe noise component along the main scanning direction is included even in those unit pixels 301, by subtracting the noise component from signals of other unit pixels 301, it is possible to obtain a high quality image in which influence of a stripe noise component along the main scanning direction is suppressed.

Note that, while the unit pixel 301 including the operational amplifier 411 has been described as an example in the present embodiment, the problem of superimposition of a stripe noise component due to fluctuations of the bias voltages BP and BN may arise also in the unit pixel 301 having a configuration without the operational amplifier 411. Therefore, the present embodiment is also applicable to an imaging element including a unit pixel having the configuration without an operational amplifier.

As described above, according to the present embodiment, when a plurality of imaging elements having the same configuration are arranged to form an imaging region, a good quality image on which the black level of the image has been adjusted or stripe noise has been removed can be acquired without arranging an optical black pixel in the effective imaging region.

Second Embodiment

An image reading apparatus according to a second embodiment of the present invention will be described with reference to FIG. 8 to FIG. 11B. The same component as that of the image reading apparatus according to the first embodiment is labeled with the same reference, and the description thereof will be omitted or simplified.

In the present embodiment, an example that realizes the same advantage as that of the first embodiment by switching the control signal PRES used for driving the MOS transistor 403 will be illustrated.

The image reading apparatus according to the present embodiment is the same as the image reading apparatus according to the first embodiment except that the configuration of the imaging element 105 is different.

Figure 8:
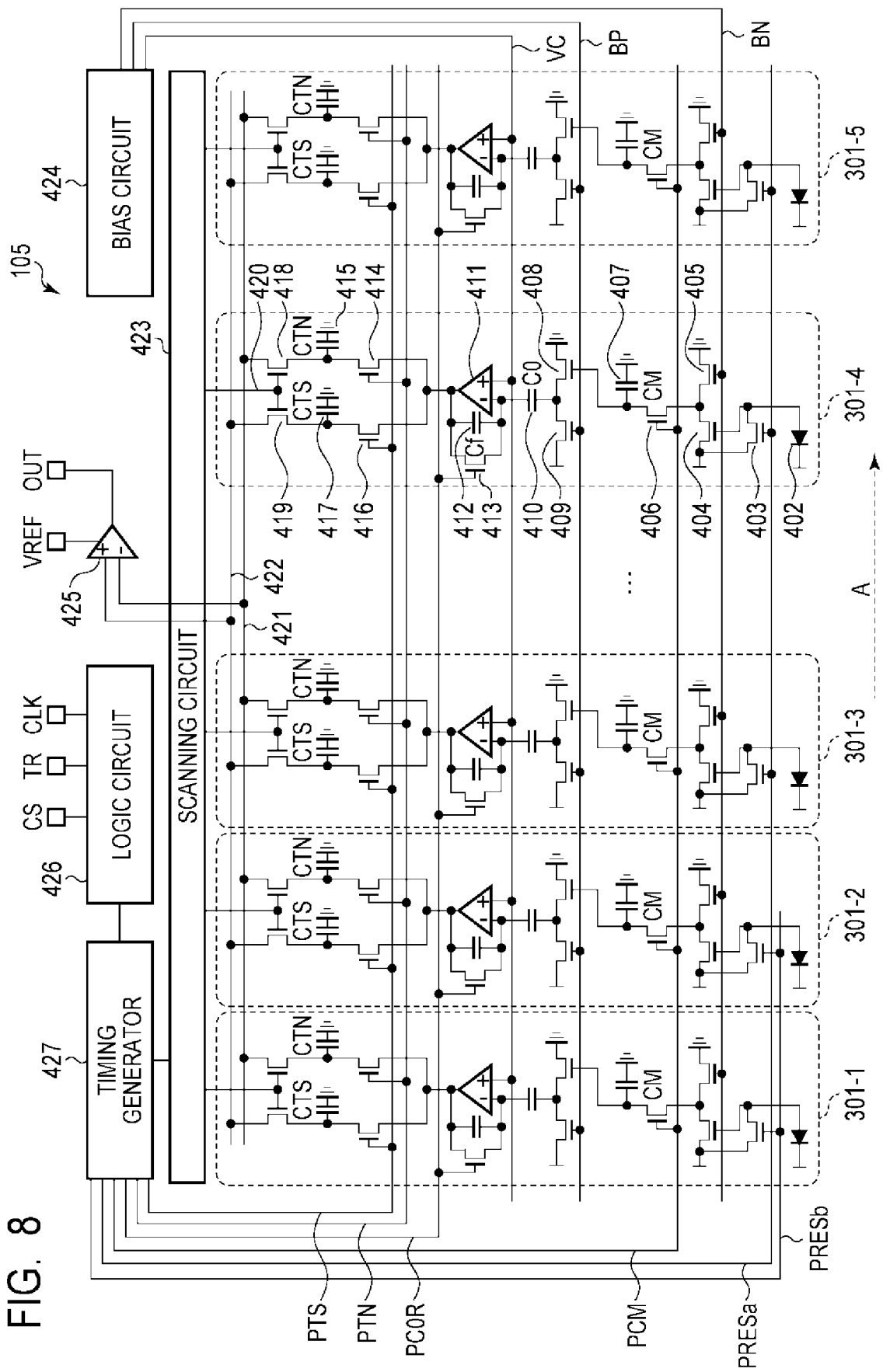
FIG. 8 is a circuit diagram illustrating a configuration example of an imaging element in an image reading apparatus according to a second embodiment of the present invention.

FIG. 8 is a circuit diagram illustrating a configuration example of the imaging element 105 in the image reading apparatus according to the present embodiment. Note that all the imaging elements 105 (the imaging elements 105a to 105d) included in one imaging device 104 have the same configuration as those in the first embodiment.

As illustrated in FIG. 8, the imaging element 105 of the present embodiment is different from the first embodiment in signal lines that connect the timing generator 427 to the MOS transistors 403 and 406 of each unit pixel 301.

That is, the gates of the MOS transistors 403 of the unit pixels 301-1, . . . , 301-4, and 301-5 are connected to a common signal line and supplied with a control signal PRESa from the timing generator 427. Further, the gates of the MOS transistors 403 of the unit pixels 301-1 and 301-2 are connected to a common signal line and supplied with a control signal PRESb from the timing generator 427. Further, a common signal line is connected to the gates of the MOS transistors 406 of the unit pixels 301-1, 301-2, 301-3, . . . , 301-4, and 301-5 and supplied with a control signal PCM from the timing generator 427.

Figure 9:
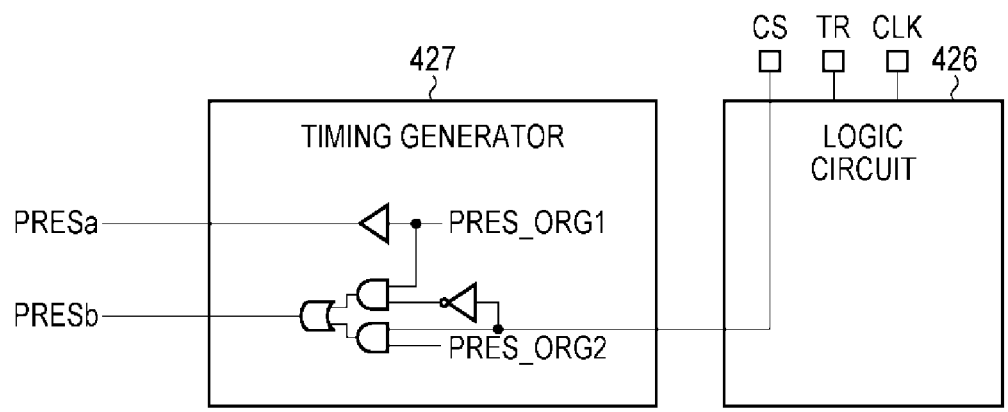
FIG. 9 is a schematic diagram illustrating a configuration example of a logic circuit and a timing generator of the imaging element in the image reading apparatus according to the second embodiment of the present invention.

FIG. 9 is a circuit diagram illustrating a configuration example of the logic circuit 426 and the timing generator 427. FIG. 9 illustrates only a portion related to the generation of the control signals PRESa and PRESb out of the circuit forming the logic circuit 426 and the timing generator 427.

The timing generator 427 starts an internal operation in response to the trigger signal TR being input via the TR terminal and counts a reference clock signal CLK input from the CLK terminal. Then, at a predetermined timing after the trigger signal TR is input, control signals PRES_ORG1 and PRES_ORG2, which are the internally generated signals, are generated. Next, the timing generator 427 generates the control signals PRESa and PRESb based on the control signal CS supplied from the CS terminal and on the control signals PRES_ORG1 and PRES_ORG2.

Specifically, when the Lo-level control signal CS is input from the CS terminal, the timing generator 427 outputs the control signal PRES_ORG1 as both the control signals PRESa and PRESb. On the other hand, when the Hi-level control signal CS is input from the CS terminal, the timing generator 427 outputs the control signal PRES_ORG1 as the control signal PRESa and outputs the control signal PRES_ORG2 as the control signal PRESb. The logic circuit that performs such logic calculation is not particularly limited and can be realized by the logic circuit illustrated in FIG. 9, for example.

Next, the operation of the imaging element in the image reading apparatus according to the present embodiment will be described with reference to FIG. 10A to FIG. 11B.

Figure 10A:
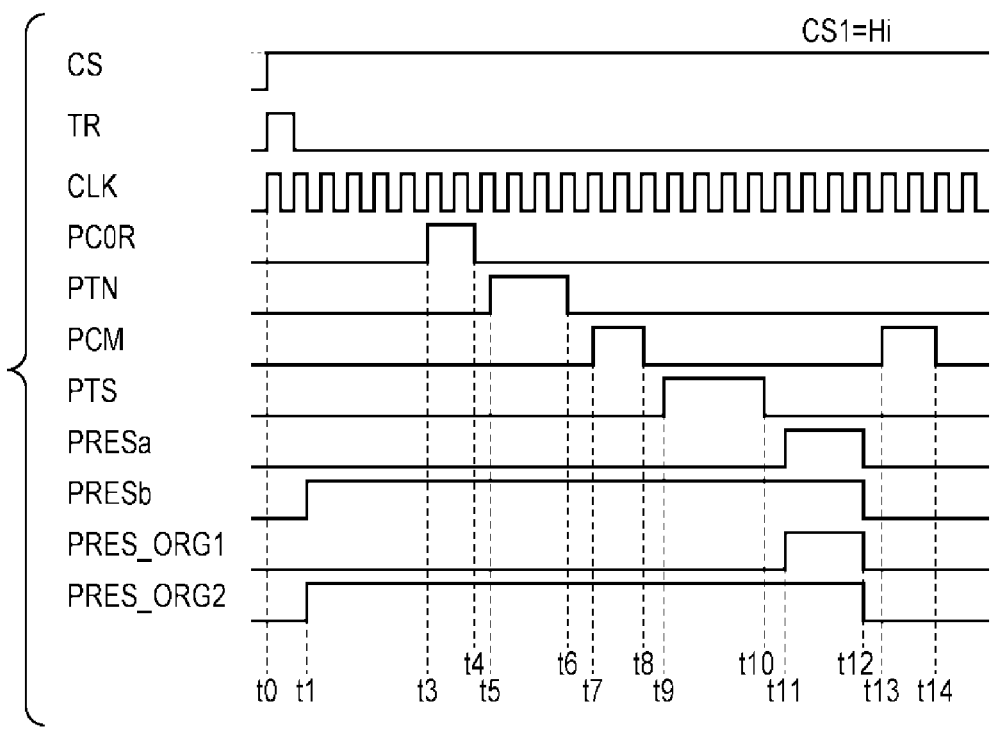
FIG. 10A and FIG. 10B are timing diagrams illustrating operation examples of the imaging element in the image reading apparatus according to the second embodiment of the present invention.
Figure 10B:
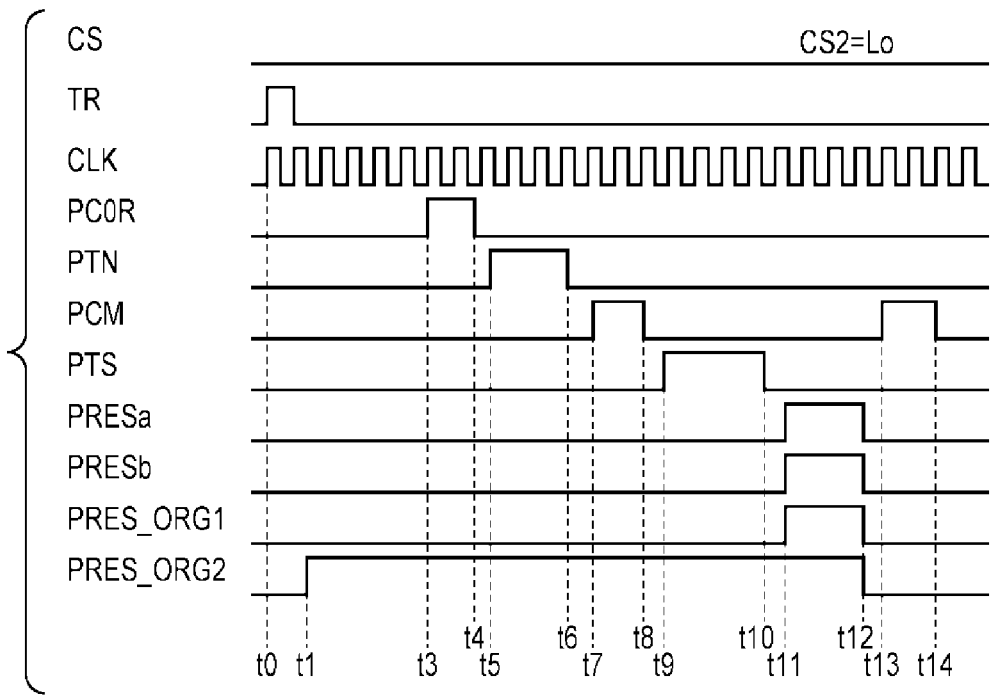

FIG. 10A and FIG. 10B are timing diagrams illustrating operation examples of the imaging elements. FIG. 10A is a timing diagram illustrating an operation example of the imaging element 105a, and FIG. 10B is a timing diagram illustrating an operation example of the imaging elements 105b to 105d. FIG. 10A and FIG. 10B illustrate, as signals used for driving the imaging elements 105, the control signal CS, the trigger signal TR, the reference clock signal CLK, the control signals PCOR, PTN, PCM, PTS, PRESa, PRESb, PRES_ORG1, and PRES_ORG2.

First, the operation of the imaging element 105a will be described with reference to FIG. 10A.

As described above, the Hi-level control signal CS (CS1) is supplied to the imaging element 105a. Therefore, the timing generator 427 outputs the control signal PRES_ORG1 as the control signal PRESa and outputs the control signal PRES_ORG2 as the control signal PRESb, as illustrated with reference to FIG. 9. Here, the control signal PRES_ORG1 is a signal that is at the Hi level during the period from time t11 to time t12. Further, the control signal PRES_ORG2 is a signal that is at the Hi level during the period from time t1 to time t12.

With such a configuration, each signal written and held in each capacitor 407 of the unit pixels 301-1 and 301-2 is the reset signal (VNcm) of the photoelectric converter 402 both in the period from time t13 to time t14 and the period from time t7 to time t8. Therefore, the output voltage VOUT which does not depend on the incident light amount can be obtained from the unit pixels 301-1 and 301-2 of the imaging element 105a.

On the other hand, each signal written and held in each capacitor 407 of the unit pixels 301-3, . . . , 301-4, and 301-5 is the optical signal (VNcm+VSpd) based on signal charge generated by the photoelectric converter 402 in the period from time t7 to time t8. Therefore, the output voltage VOUT in accordance with the incident light amount can be obtained from the unit pixels 301-3, . . . , 301-4, and 301-5 of the imaging element 105a.

Next, the operation of the imaging elements 105b to 105d will be described with reference to FIG. 10B. As described above, the Lo-level control signal CS (CS2) is supplied to the imaging elements 105b to 105d. Therefore, as illustrated with reference to FIG. 9, the timing generator 427 outputs the control signal PRES_ORG1 as control signals PRESa and PRESb.

With such a configuration, each signal written and held in each capacitor 407 of all the unit pixels 301 of the imaging elements 105b to 105d is the optical signal (VNcm+VSpd) based on signal charge generated by the photoelectric converter 402 in the period from time t7 to time t8. Therefore, the output voltage VOUT in accordance with the incident light amount can be obtained from the unit pixels 301-3, . . . , 301-4, and 301-5 of the imaging element 105a.

Note that the control signal PRESb supplied to the unit pixels 301-1 and 301-2 of the imaging element 105a is not necessarily required to be maintained at the Hi level during the entire period from time t1 to time t12.

Figure 11A:
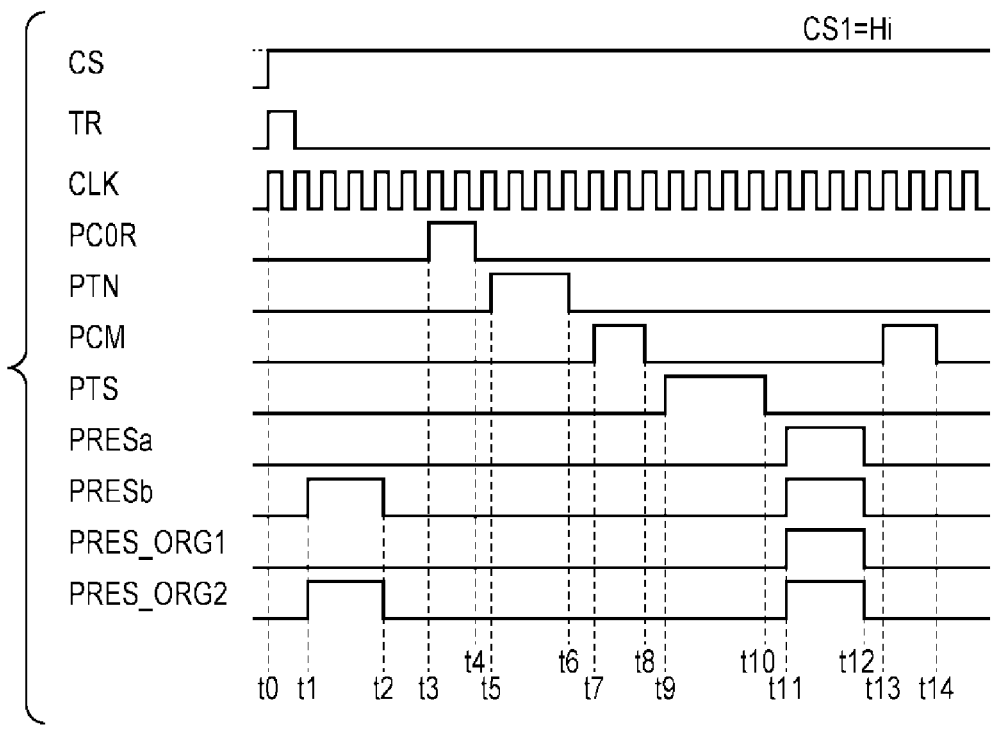
FIG. 11A and FIG. 11B are timing diagrams illustrating other operation examples of the imaging element in the image reading apparatus according to the second embodiment of the present invention.
Figure 11B:
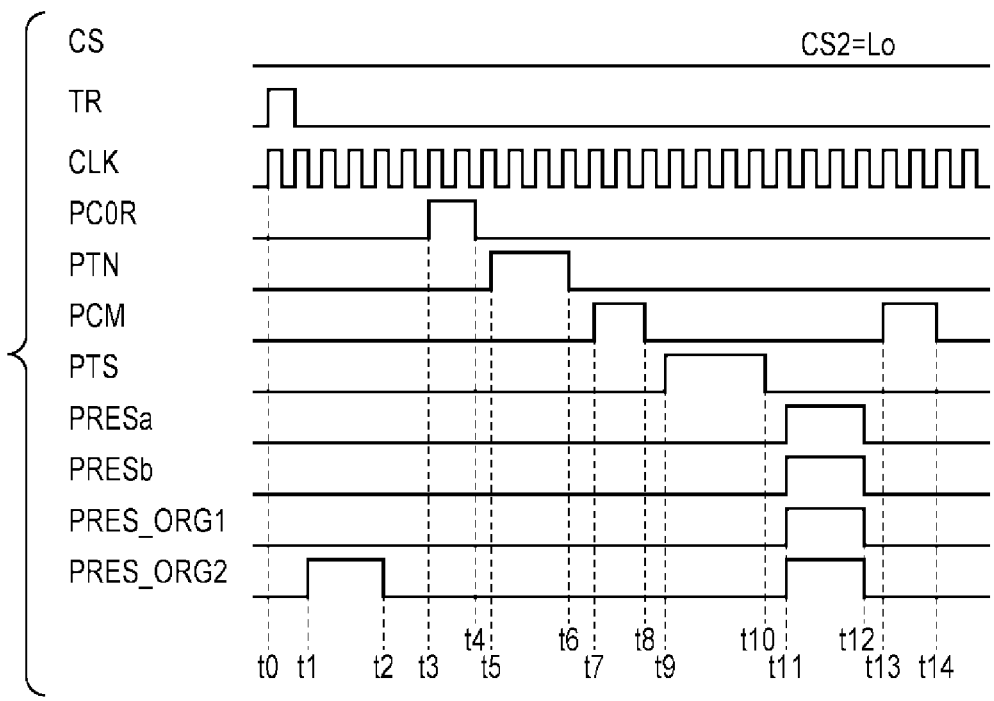

FIG. 11A and FIG. 11B are timing diagrams illustrating another operation example of the imaging elements. FIG. 11A is a timing diagram illustrating an operation of the imaging element 105a, and FIG. 11B is a timing diagram illustrating an operation of the imaging elements 105b to 105d.

As illustrated in FIG. 11A and FIG. 11B, the control signal PRESb supplied to the unit pixels 301-1 and 301-2 of the imaging element 105a may be at the Lo level during a period from time t2 to time t11. That is, the control signal PRES_ORG2 may be a signal that is at the Hi level during the period from time t1 to time t2 and the period from time t11 to time t12.

Also with such a configuration, the signal written and held in each capacitor 407 of the unit pixels 301-1 and 301-2 is the reset signal (VNcm) of the photoelectric converter 402 during the period from time t13 to time t14 and the period from time t7 to time t8. Therefore, the output voltage VOUT which does not depend on the incident light amount can be obtained from the unit pixels 301-1 and 301-2 of the imaging element 105a.

As described above, also in the present embodiment, even though the plurality of image elements 105a to 105d have the same configuration and include no optical black pixel, the output signal which does not depend on an incident light amount can be obtained from some of the unit pixels 301. Since a stripe noise component along the main scanning direction is included also in such some of the unit pixels 301, by subtracting the noise component from a signal of another unit pixel 301, it is possible to obtain a high quality image in which influence of a stripe noise component along the main scanning direction is suppressed.

As described above, according to the present embodiment, when a plurality of imaging elements having the same configuration are arranged to form an imaging region, a good quality image on which the black level of the image has been adjusted or stripe noise has been removed can be acquired without arranging an optical black pixel in the effective imaging region.

Third Embodiment

An image reading apparatus according to a third embodiment of the present invention will be described with reference to FIG. 12 to FIG. 14B. The same component as that of the image reading apparatus according to the first and second embodiments is labeled with the same reference, and the description thereof will be omitted or simplified.

In the present embodiment, an example that realizes the same advantage as that of the first embodiment by switching the control signal PTS used for driving the MOS transistor 416 will be illustrated.

The image reading apparatus according to the present embodiment is the same as the image reading apparatus according to the first embodiment except that the configuration of the imaging element 105 is different.

Figure 12:
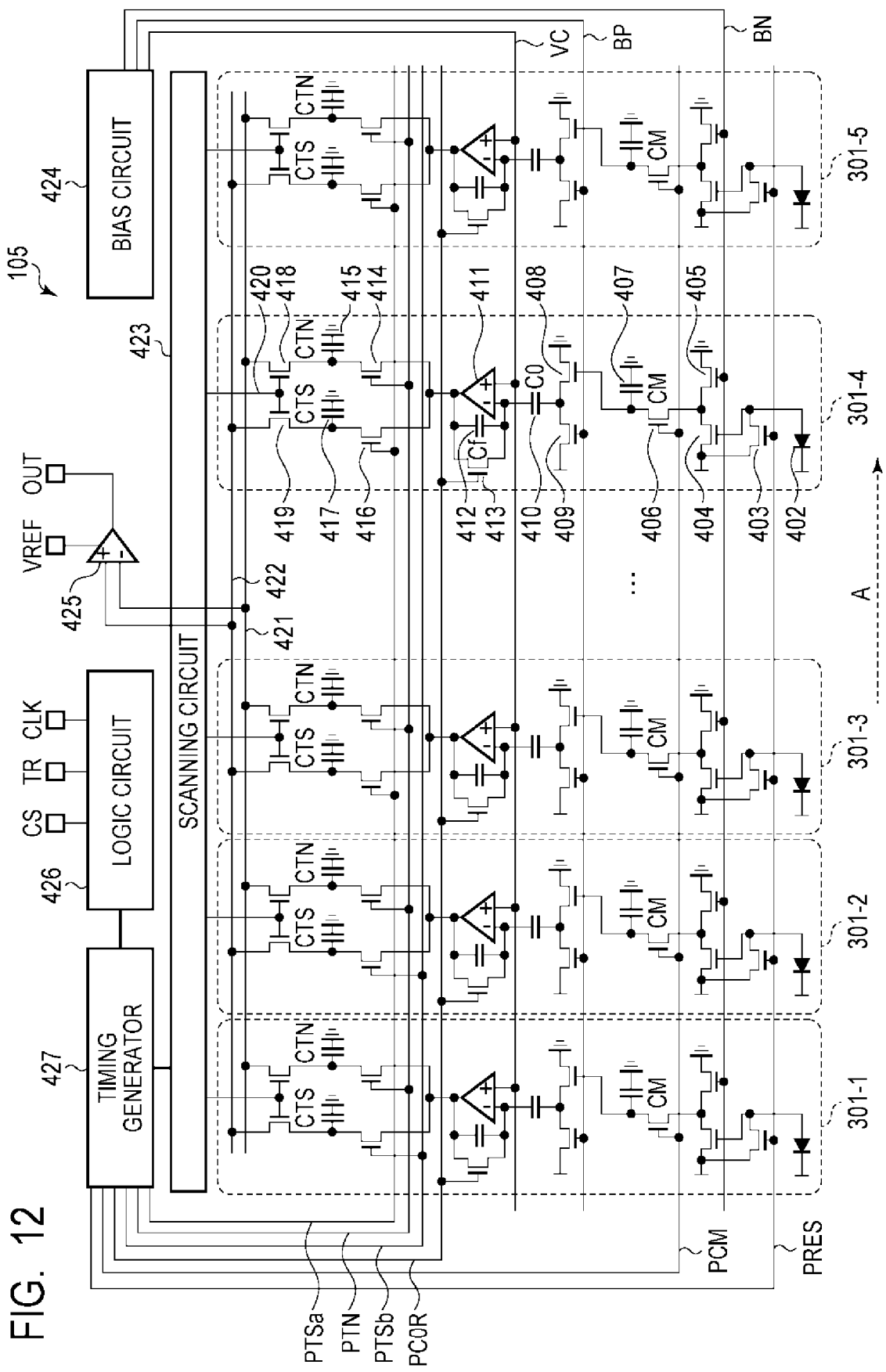
FIG. 12 is a circuit diagram illustrating a configuration example of an imaging element in an image reading apparatus according to a third embodiment of the present invention.

FIG. 12 is a circuit diagram illustrating a configuration example of the imaging element 105 in the image reading apparatus according to the present embodiment. Note that all the imaging elements 105 (the imaging elements 105a to 105d) included in one imaging device 104 have the same configuration as those in the first embodiment.

As illustrated in FIG. 12, the imaging element 105 of the present embodiment is different from the first embodiment in signal lines that connect the timing generator 427 and the MOS transistors 406 and 416 of each unit pixel 301.

That is, a common signal line is connected to the gates of the MOS transistors 416 of the unit pixels 301-3, . . . , 301-4, and 301-5 and supplied with a control signal PTSa from the timing generator 427. Further, a common signal line is connected to the gates of the MOS transistors 416 of the unit pixels 301-1 and 301-2 and supplied with a control signal PTSb from the timing generator 427. Further, a common signal line is connected to the gates of the MOS transistors 406 of the unit pixels 301-1, 301-2, 301-3, . . . , 301-4, and 301-5 and supplied with a control signal PCM from the timing generator 427.

Figure 13:
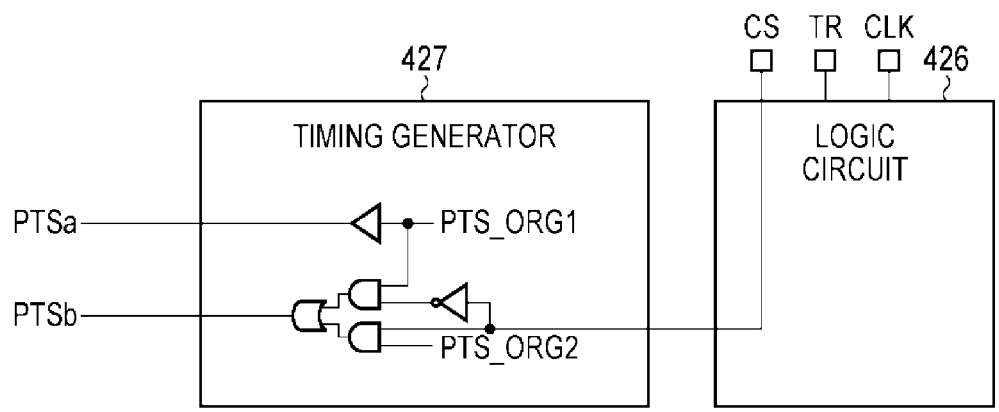
FIG. 13 is a schematic diagram illustrating a configuration example of a logic circuit and a timing generator of the imaging element in the image reading apparatus according to the third embodiment of the present invention.

FIG. 13 is a circuit diagram illustrating a configuration example of the logic circuit 426 and the timing generator 427. FIG. 13 illustrates only a portion related to the generation of the control signals PTSa and PTSb out of the circuit forming the logic circuit 426 and the timing generator 427.

The timing generator 427 starts an internal operation in response to the trigger signal TR being input via the TR terminal and counts a reference clock signal CLK input from the CLK terminal. Then, at a predetermined timing after the trigger signal TR is input, control signals PTS_ORG1 and PTS_ORG2, which are the internally generated signals, are generated. Next, the timing generator 427 generates the control signals PTSa and PTSb based on the control signal CS supplied from the CS terminal and on the control signals PTS_ORG1 and PTS_ORG2.

Specifically, when the Lo-level control signal CS is input from the CS terminal, the timing generator 427 outputs the control signal PTS_ORG1 as both the control signals PTSa and PTSb. On the other hand, when the Hi-level control signal CS is input from the CS terminal, the timing generator 427 outputs the control signal PTS_ORG1 as the control signal PTSa and outputs the control signal PTS_ORG2 as the control signal PTSb. The logic circuit that performs such logic calculation is not particularly limited and can be realized by the logic circuit illustrated in FIG. 13, for example.

Next, the operation of the imaging element in the image reading apparatus according to the present embodiment will be described with reference to FIG. 14A and FIG. 14B.

Figure 14A:
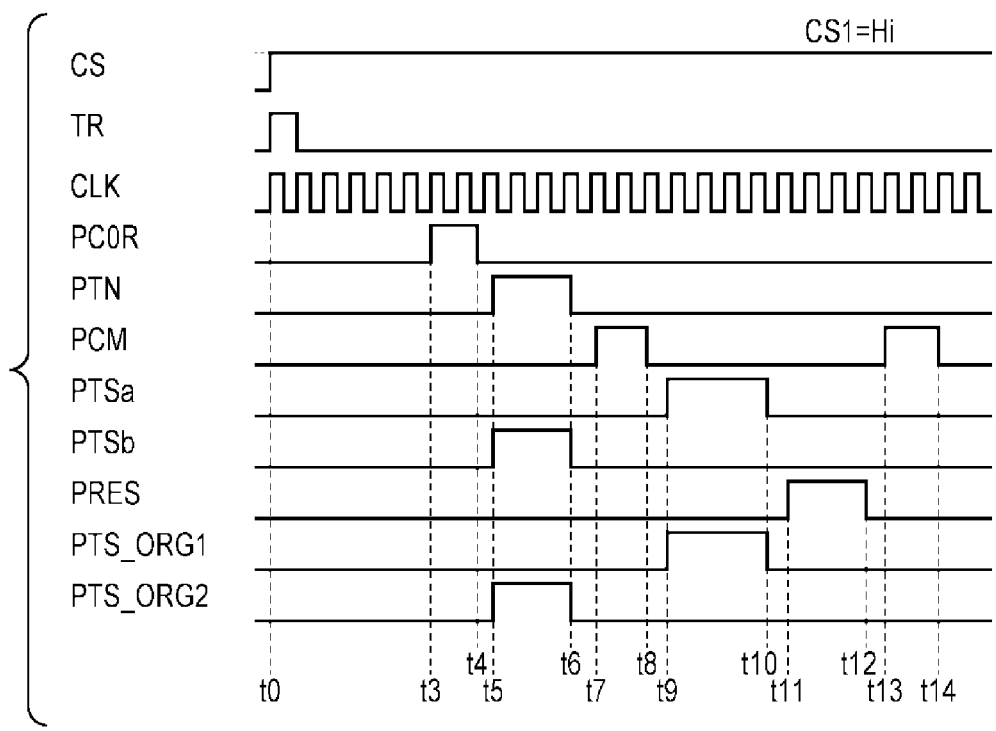
FIG. 14A and FIG. 14B are timing diagrams illustrating operation examples of the imaging element in the image reading apparatus according to the third embodiment of the present invention.
Figure 14B:
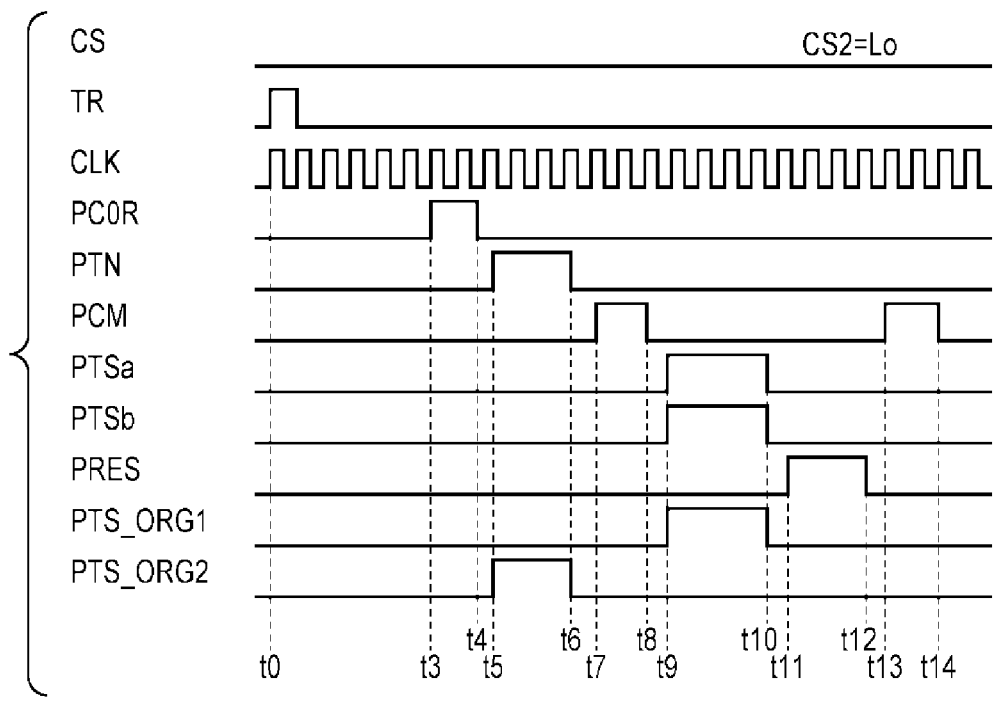

FIG. 14A and FIG. 14B are timing diagrams illustrating operation examples of the imaging elements. FIG. 14A is a timing diagram illustrating an operation example of the imaging element 105a, and FIG. 14B is a timing diagram illustrating an operation example of the imaging elements 105b to 105d. FIG. 14A and FIG. 14B illustrate, as signals used for driving the imaging elements 105, the control signal CS, the trigger signal TR, the reference clock signal CLK, the control signals PCOR, PTN, PCM, PTSa, PTSb, PRES, PTS_ORG1, and PTS_ORG2.

First, the operation of the imaging element 105a will be described with reference to FIG. 14A.

As described above, the Hi-level control signal CS (CS1) is supplied to the imaging element 105a. Therefore, the timing generator 427 outputs the control signal PTS_ORG1 as the control signal PTSa and outputs the control signal PTS_ORG2 as the control signal PTSb, as illustrated with reference to FIG. 13. Here, the control signal PTS_ORG1 is a signal that is at the Hi level during the period from time t9 to time t10. Further, the control signal PTS_ORG2 is a signal that is at the Hi level during the period from time t5 to time t6 as with the control signal PTN.

With such a configuration, each signal written and held in each capacitor 417 of the unit pixels 301-1 and 301-2 is the reset signal (VNct) of the photoelectric converter 402 in the same manner as the signal written and held in the capacitor 415. Therefore, the output voltage VOUT which does not depend on the incident light amount can be obtained from the unit pixels 301-1 and 301-2 of the imaging element 105a.

On the other hand, each signal written and held in each capacitor 417 of the unit pixels 301-3, . . . , 301-4, and 301-5 is the optical signal (VSct) based on signal charge generated by the photoelectric converter 402. Therefore, the output voltage VOUT in accordance with the incident light amount can be obtained from the unit pixels 301-3, . . . , 301-4, and 301-5 of the imaging element 105a.

Next, the operation of the imaging elements 105b to 105d will be described with reference to FIG. 14B. As described above, the Lo-level control signal CS (CS2) is supplied to the imaging elements 105b to 105d. Therefore, as illustrated with reference to FIG. 13, the timing generator 427 outputs the control signal PTS_ORG1 as control signals PTSa and PTSb.

With such a configuration, each signal written and held in each capacitor 417 of all the unit pixels 301 of the imaging elements 105b to 105d is the optical signal (VSct) based on signal charge generated by the photoelectric converter 402. Therefore, the output voltage VOUT in accordance with the incident light amount can be obtained from the unit pixels 301-3, . . . , 301-4, and 301-5 of the imaging element 105a.

As described above, also in the present embodiment, even though the plurality of image elements 105a to 105d have the same configuration and include no optical black pixel, the output signal which does not depend on an incident light amount can be obtained from some of the unit pixels 301. Since a stripe noise component along the main scanning direction is included in such some of the unit pixels 301, by subtracting the noise component from a signal of another unit pixel 301, it is possible to obtain a high quality image in which influence of a stripe noise component along the main scanning direction is suppressed.

As described above, according to the present embodiment, when a plurality of imaging elements having the same configuration are arranged to form an imaging region, a good quality image on which the black level of the image has been adjusted or stripe noise has been removed can be acquired without arranging an optical black pixel in the effective imaging region.

Fourth Embodiment

An imaging device according to a fourth embodiment of the present invention will be described with reference to FIG. 15 to FIG. 18C. The same component as that of the image reading apparatus according to the first to third embodiments is labeled with the same reference, and the description thereof will be omitted or simplified.

First, the general configuration of the imaging device according to the present embodiment will be described with reference to FIG. 15. FIG. 15 is a schematic diagram illustrating a configuration example of the imaging device according to the present embodiment.

As illustrated in FIG. 15, an imaging device 200 according to the present embodiment includes a substrate 210 and a plurality of imaging elements 220a, 220b, 220c, 220d, 220e, and 220f. Each of the imaging elements 220a to 220f is an area-type imaging element in which a plurality of pixels are two-dimensionally arranged. The plurality of pixels include effective pixels 230 arranged so as to receive light (not shielded from light) and optical black pixels 240 shielded from light (hatched unit pixels in FIG. 15).

The imaging elements 220a to 220f are arranged two-dimensionally on the substrate 210. Thereby, the imaging elements 220a to 220f form one imaging region on the substrate 210. The imaging device 200 configured in such a way can have an ultra-wide field of view and is applicable to an imaging device for X-ray or an imaging device for a telescope, for example.

The imaging elements 220a to 220f are imaging elements all having the same configuration. The imaging elements 220d, 220e, and 220f are rotated by 180 degrees with respect to the imaging elements 220a, 220b, and 220c and mounted on the substrate 210. With such rotation and mounting, a region in which no effective pixel 230 is arranged, that is, a region in which the optical black pixels 240 or the input/output terminals are arranged is not arranged on the joining part between the imaging elements 220.

Note that, in association with the imaging elements 220d to 220f being rotated by 180 degrees with respect to the imaging elements 220a to 220c and mounted, it is desirable that the signal readout direction inside the imaging element be opposite between the imaging elements 220a to 220c and the image elements 220d to 220f. By adding such a function to the imaging elements 220a to 220f, the output order of signals can be unified in the same direction as the entire imaging device 200.

On the substrate 210, common wirings used for supplying the power supply voltage VDD, the ground voltage GND, the reference voltage VREF, the trigger signal TR, the reference clock signal CLK, and the control signal CS are provided to each of the imaging elements 220a to 220f. Further, on the substrate 210, output wirings used for outputting the output signals of the imaging elements 220a to 220f from the OUT terminals (OUTa to OUTf) are provided.

When one continuous effective imaging region is intended to be formed by tiling three or more imaging elements 220 having the same configuration, it is not possible to arrange the optical black pixels 240 along two sides orthogonal to each other out of four sides surrounding the imaging region of each of the imaging elements 220. This is because, if the optical black pixels 240 were arranged along two sides orthogonal to each other of the imaging element 220, the optical black pixel 240 would be necessarily arranged anywhere in a region between the imaging elements 220. Thus, as with FIG. 15, for example, when three imaging elements 220 are arranged in the horizontal direction and when two imaging elements 220 are arranged in the vertical direction, it is not possible to arrange the optical black pixels 240 in a region such as the region 250 that spans over the entire region in the vertical direction, for example. With such arrangement, since there is no optical black pixel 240 over the entire region in the vertical direction, it is not possible to remove stripe noise along the horizontal direction by using a signal of the optical black pixel 240.

In view of the above, the imaging device 200 of the present embodiment is configured to also obtain an output signal which does not depend on an incident light amount from some of the effective pixels 230 as with the case of the first to third embodiments.

Figure 16:
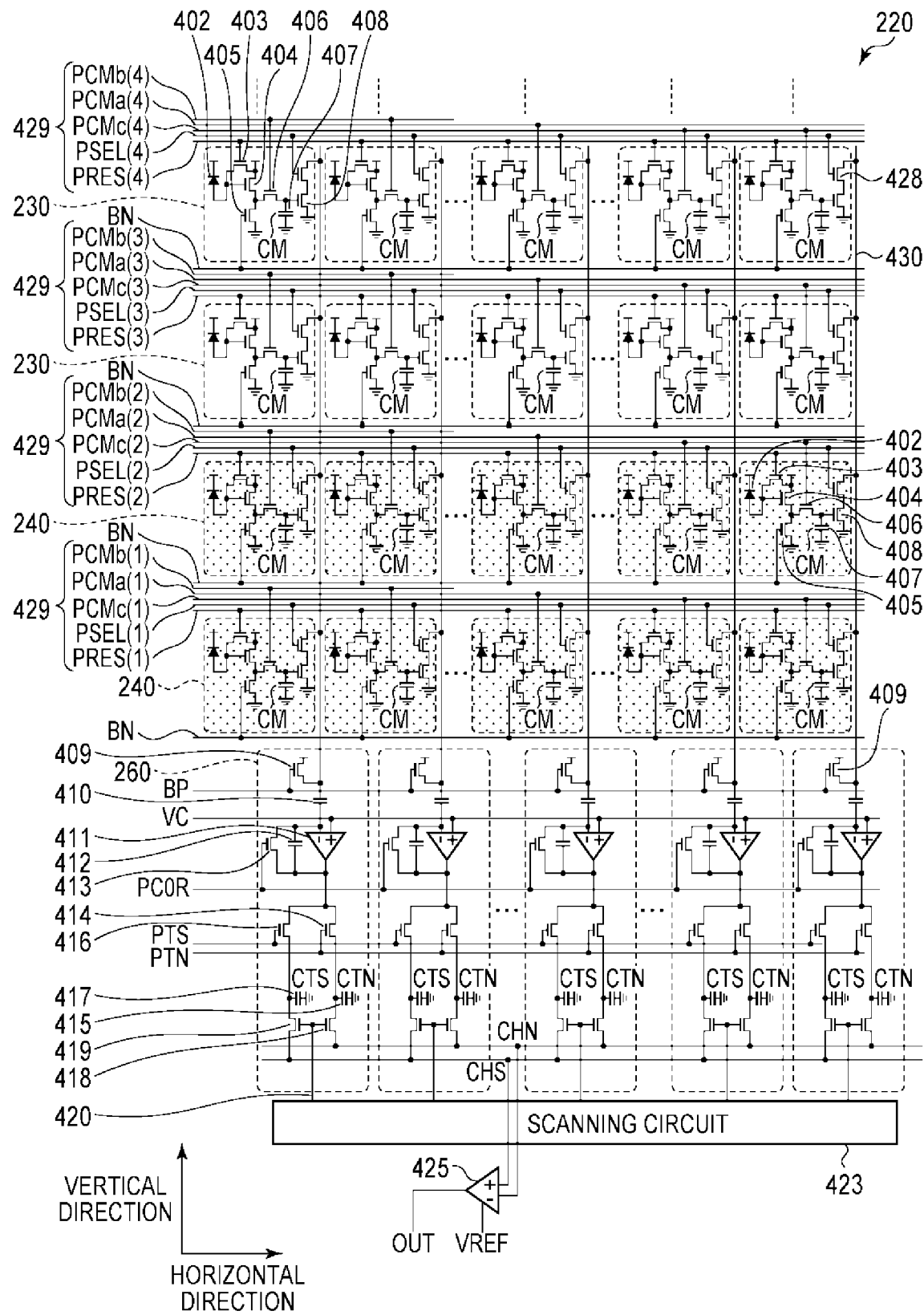
FIG. 16 is a circuit diagram illustrating a configuration example of an imaging element in the imaging device according to the fourth embodiment of the present invention.

FIG. 16 is a circuit diagram illustrating a configuration example of the imaging element 220 in the imaging device 200 according to the present embodiment. Note that all the imaging elements 220 (the imaging elements 220a to 220 included in one imaging device 200 have the same configuration.

The imaging element 220 includes the plurality of effective pixels 230 and the plurality of optical black pixels 240. These pixels are arranged two-dimensionally over a plurality of rows (N rows) and a plurality of columns (M columns). The optical black pixels 240 are arranged on the first row and the second row of the two-dimensional pixel array configured in such a way. The effective pixels 230 are arranged on the third and subsequent rows of the two-dimensional pixel array. Further, the imaging element 220 includes a plurality of column circuits 260 provided in association with respective columns of the two-dimensional pixel array, the scanning circuit 423, and the readout amplifier 425.

Each of the effective pixels 230 and the optical black pixels 240 includes components corresponding to the photoelectric converter 402, the MOS transistors 403, 404, 405, 406, and 408, and the capacitor 407 out of the components of the unit pixel 301 described in the first to third embodiments. For simplified illustration here, corresponding components are labeled with the same references. The connection relationship of these components is the same as that in the unit pixel 301. Further, each of the effective pixels 230 and the optical black pixels 240 further includes the MOS transistor 428 forming a select transistor. The drain of the MOS transistor 428 is connected to the source of the MOS transistor 408.

On each row of the two-dimensional pixel array, control lines 429 arranged in the horizontal direction are provided. Each of the control lines 429 is connected to the effective pixels 230 or the optical black pixels 240 arranged on a corresponding row to form a signal line common to these pixels. Each of the control lines 429 includes a signal line that supplies the control signal PRES, a signal line that supplies the control signal PSEL, a signal line that supplies the control signal PCMa, a signal line that supplies the control signal PCMb, and a signal line that supplies the control signal PCMc.

The signal line that supplies the control signal PRES is connected to the gates of the MOS transistors 403 (reset transistors) of the effective pixels 230 or the optical black pixels 240 arranged on a corresponding row. The signal line that supplies the control signal PSEL is connected to the gates of the MOS transistors 428 (select transistors) of the effective pixels 230 or the optical black pixels 240 arranged on a corresponding row. The signal line that supplies the control signal PCMa is connected to the gates of the MOS transistors 406 of the effective pixels 230 or the optical black pixels 240 arranged on the third to (M−2)-th columns on a corresponding row. The signal line that supplies the control signal PCMb is connected to the gates of the MOS transistors 406 of the effective pixels 230 or the optical black pixels 240 arranged on the first column and the second column on a corresponding row. The signal line that supplies the control signal PCMc is connected to the gates of the MOS transistors 406 of the effective pixels 230 or the optical black pixels 240 arranged on the (M−1)-th column and the M-th column on a corresponding row.

In FIG. 16, to distinguish control signals supplied to the effective pixels 230 or the optical black pixels 240 on each row, a row number n is attached to the reference of each control signal. For example, the control signal PRES supplied to pixels on the third row is denoted as "PRES(3)".

On each column of the two-dimensional pixel array, a vertical common line 430 arranged in the vertical direction is provided. Each of the vertical common lines 430 is connected to the sources of the MOS transistors 428 of the effective pixels 230 and the optical black pixels 240 arranged on a corresponding column to form a signal line common to these pixels.

Each of the column circuits 260 includes components corresponding to the MOS transistors 409, 413, 414, 416, 418, and 419, the capacitors 410, 412, 415, and 417, and the operational amplifier 411 out of the components of the unit pixel 301 described in the first to third embodiments. For simplified illustration here, corresponding components are labeled with the same references. The connection relationship of these components is the same as that in the unit pixel 301. The drain of the MOS transistor 409 is connected to the vertical common line 430 on a corresponding column.

Note that, although not illustrated in FIG. 16, the imaging element 220 further includes a vertical scanning circuit that supplies control signals on a row basis to the effective pixels 230 and the optical black pixels 240 and the logic circuit 426 and the timing generator 427 described in the first to third embodiments.

As described above, the imaging element 220 of the present embodiment is an area-type imaging element and thus has a different configuration from the unit pixel 301 of the line-type imaging element 105 described in the first to third embodiments. By controlling the control signal PSEL on any of the plurality of rows to the Hi level and turning on the MOS transistors 428 on a corresponding row, it is possible to read out signals of pixels for one row in parallel up to the capacitors 415 and 417 in the same manner as in the first to third embodiments.

Each of the column circuits 260 is shared by the effective pixels 230 and the optical black pixels on a corresponding column. By supplying control signals of pixels from the vertical scanning circuit (not illustrated) sequentially on a row basis, it is possible to sequentially read out pixel signals of pixels belonging to each row to the column circuit 260.

In the imaging element 220 of the present embodiment, the control line 429 on each row includes a signal line that supplies the control signal PCMa, a signal line that supplies the control signal PCMb, and a signal line that supplies the control signal PCMc as signal lines used for controlling writing to the capacitor 407. This is because the imaging elements 220d to 220f are rotated by 180 degrees with respect to the imaging elements 220a to 220c and mounted. For example, when the effective pixels 230 arranged in the region 250 in FIG. 15 are used as pixels that output signals which do not depend on an incident light amount, columns belonging to the region 250 are the first column and the second column in the imaging element 220f. On the other hand, in the imaging element 220a, columns belonging to the region 250 are the (M−1)-th column and the M-th column.

Accordingly, in the present embodiment, the control signal PCMb and the control signal PCMc are used as control signals used for selecting effective pixels 230 that output signals which do not depend on an incident light amount. Further, to generate these three types of control signals PCMa, PCMb, and PCMc, two systems of CS terminals (CS1 terminal and CS2 terminal) are provided in each of the imaging elements 220. With two systems of CS terminals, at most four ways of operations can be selected.

Further, in the present embodiment, the effective pixels 230 that can output signals which do not depend on an incident light amount are arranged on columns along both ends of the pixel array forming the imaging region of the imaging element 220. Thereby, also when some of the imaging elements 220 are rotated by 180 degrees with respect to another imaging element 220 and mounted, all the effective pixels 230 arranged on the same column along the end of the imaging region of the imaging device 200 can be used as pixels that output signals which do not depend on an incident light amount.

Figure 17:
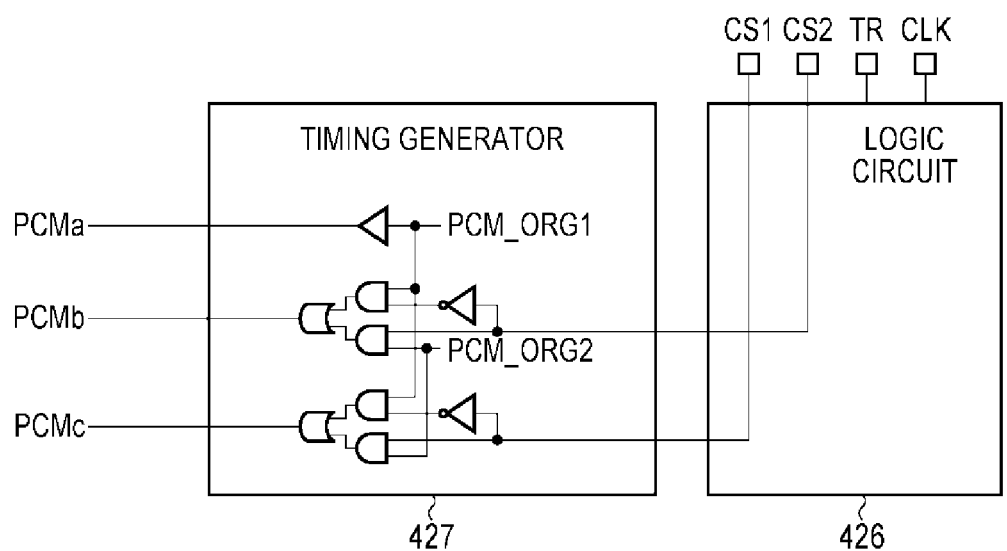
FIG. 17 is a schematic diagram illustrating a configuration example of a logic circuit and a timing generator of the imaging element in the imaging device according to the fourth embodiment of the present invention.

FIG. 17 is a circuit diagram illustrating a configuration example of the logic circuit 426 and the timing generator 427. FIG. 17 illustrates only a portion related to the generation of the control signals PCMa, PCMb, and PCMc in the circuit forming the logic circuit 426 and the timing generator 427.

The timing generator 427 starts an internal operation in response to the trigger signal TR being input via the TR terminal and counts a reference clock signal CLK input from the CLK terminal. Then, at a predetermined timing after the trigger signal TR is input, control signals PCM_ORG1 and PCM_ORG2, which are the internally generated signals, are generated. Next, the timing generator 427 generates the control signals PCMa, PCMb, and PCMc based on the control signals CS1 and CS2 and on the control signals PCM_ORG1 and PCM_ORG2.

Specifically, when the Lo-level control signals CS1 and CS2 are input, the timing generator 427 outputs the control signal PCM_ORG1 all as the control signals PCMa, PCMb, and PCMc. When the Hi-level control signal CS1 and the Lo-level control signal CS2 are input, the timing generator 427 outputs the control signal PCM_ORG1 as the control signals PCMa and PCMb and outputs the control signal PCM_ORG2 as the control signal PCMc. When the Lo-level control signal CS1 and the Hi-level control signal CS2 are input, the timing generator 427 outputs the control signal PCM_ORG1 as the control signals PCMa and PCMc and outputs the control signal PCM_ORG2 as the control signal PCMb. The logic circuit that performs such logic calculation is not particularly limited and can be realized by the logic circuit illustrated in FIG. 17, for example.

Figure 18A:
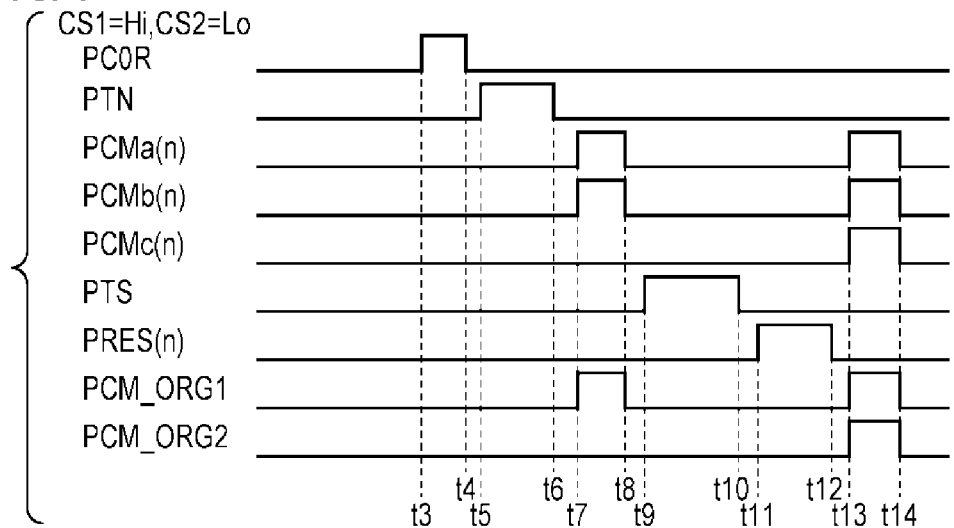
FIG. 18A, FIG. 18B, and FIG. 18C are timing diagrams illustrating operation examples of the imaging element in the imaging device according to the fourth embodiment of the present invention.
Figure 18B:
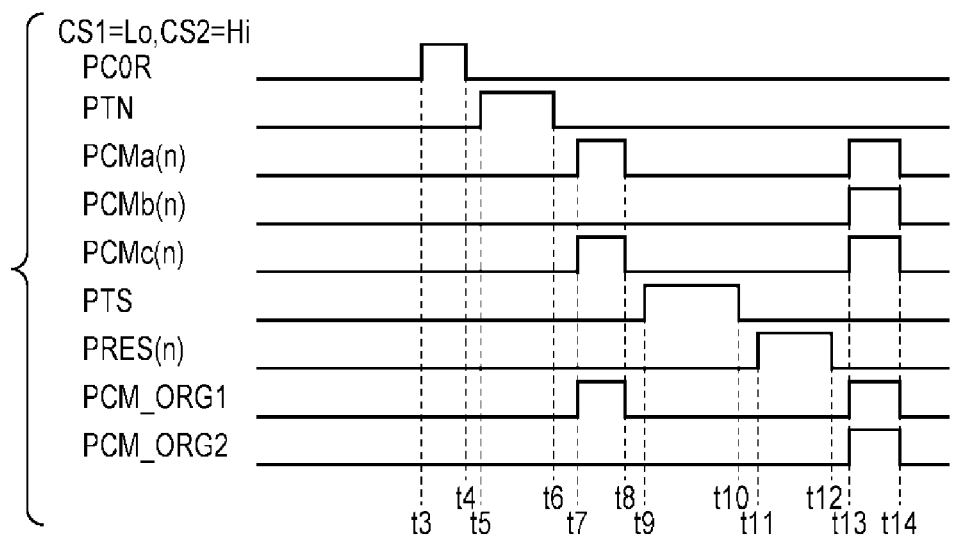
Figure 18C:
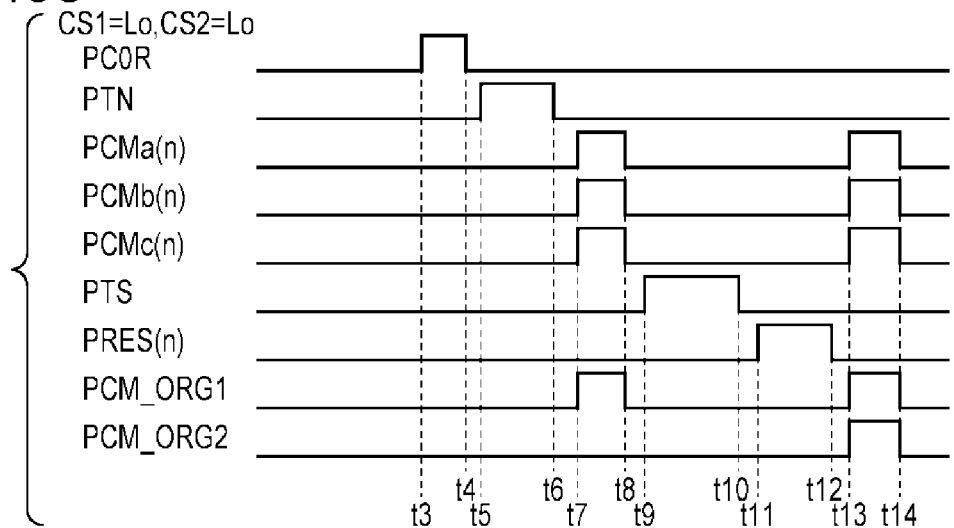

Next, the operation of the imaging element in the imaging device according to the present embodiment will be described with reference to FIG. 18A to FIG. 18C. FIG. 18A to FIG. 18C are timing diagrams illustrating operation examples of the imaging elements. FIG. 18A is a timing diagram illustrating an operation example of the imaging element 220a, FIG. 18B is a timing diagram illustrating an operation example of the imaging elements 220f, and FIG. 18C is a timing diagram illustrating an operation example of the imaging elements 220b to 220e. FIG. 18A to FIG. 18C illustrate, as signals used for driving the imaging elements 220, the control signals PC0R, PTN, PCMa(n), PCMb(n), PCMc(n), PTS, PRES(n), PCM_ORG1, and PCM_ORG2.

In the same manner as FIG. 7A and FIG. 7B described in the first embodiment, the period from time t13 to time t14 is a period in which a reset signal is written to the capacitor 407, and the period from time t7 to time t8 is a period in which an optical signal is written to the capacitor 407.

In the imaging element 220a, as illustrated in FIG. 18A, the control signal PCMc(n) associated with pixels on the (M−1)-th column and the M-th column remains at the Lo level during the period from time t7 to time t8. Therefore, pixels located in the region 250 of FIG. 15 each output a constant signal regardless of an incident light amount even when the pixels are the effective pixels 230. On the other hand, the control signals PCMa(n) and PCMb(n) associated with pixels on the first column to the (M−2)-th column are at the Hi level during the period from time t7 to time t8. Therefore, the effective pixels 230 arranged on these columns output signals in accordance with an incident light amount.

In the imaging element 220f, as illustrated in FIG. 18B, the control signal PCMb(n) associated with pixels on the first column and the second column remains at the Lo level during the period from time t7 to time t8. Therefore, pixels located in the region 250 of FIG. 15 each output a constant signal regardless of an incident light amount even when the pixels are the effective pixels 230. On the other hand, the control signals PCMa(n) and PCMc(n) associated with pixels on the third column to the M-th column are at the Hi level during the period from time t7 to time t8. Therefore, the effective pixels 230 arranged on these columns output signals in accordance with an incident light amount.

In the imaging elements 220b to 220e, as illustrated in FIG. 18C, the control signals PCMa(n), PCMb(n), and PCMc(n) associated with pixels on all the columns are at the Hi level during a period from time t7 to time t8. Therefore, all the effective pixels 230 in the imaging element 220b to the imaging element 220e output signals in accordance with an incident light amount.

By causing the imaging device 200 to operate in such a way, pixels belonging to the region 250 of FIG. 15 output signals which do not depend on an incident light amount even when the pixels are the effective pixels 230 arranged so as to receive light (not shielded from light). Therefore, by subtracting pixel signals of the effective pixels 230 arranged in the region 250 from pixel signals of the effective pixels 230 arranged in another region, it is possible to reduce stripe noise along the horizontal direction occurring when reading out signals from the effective pixels 230 to the capacitors 415 and 417. Thereby, a good quality image can be obtained as the output of the imaging device 200.

When correcting stripe noise along the horizontal direction, it is desirable to output signals of the effective pixels 230 belonging to the region 250 before outputting signals of unit pixels in accordance with an incident light amount. With such a configuration, since the amount of stripe noise can be calculated earlier, a correction process can be easily performed.

Note that, while output signals which do not depend on the incident light amount are obtained from some of the effective pixels 230 by controlling the control signal PCM(n) in the present embodiment, it is also possible to use the control signal PRES(n) and the control signals PTS and PTN in the same manner as in the second or third embodiment.

Further, while the column circuit 260 including the operational amplifier 411 has been described as an example in the present embodiment, the problem of superimposition of a stripe noise component due to fluctuations of bias voltages BP and BN may arise also in the column circuit 260 having a configuration without an operational amplifier. Therefore, the present embodiment is also applicable to an imaging element including a column circuit having a configuration without an operational amplifier.

As described above, according to the present embodiment, when a plurality of imaging elements having the same configuration are arranged to form an imaging region, a good quality image on which the black level of the image has been adjusted or stripe noise has been removed can be acquired without arranging an optical black pixel in the effective imaging region.

Fifth Embodiment

Figure 19:
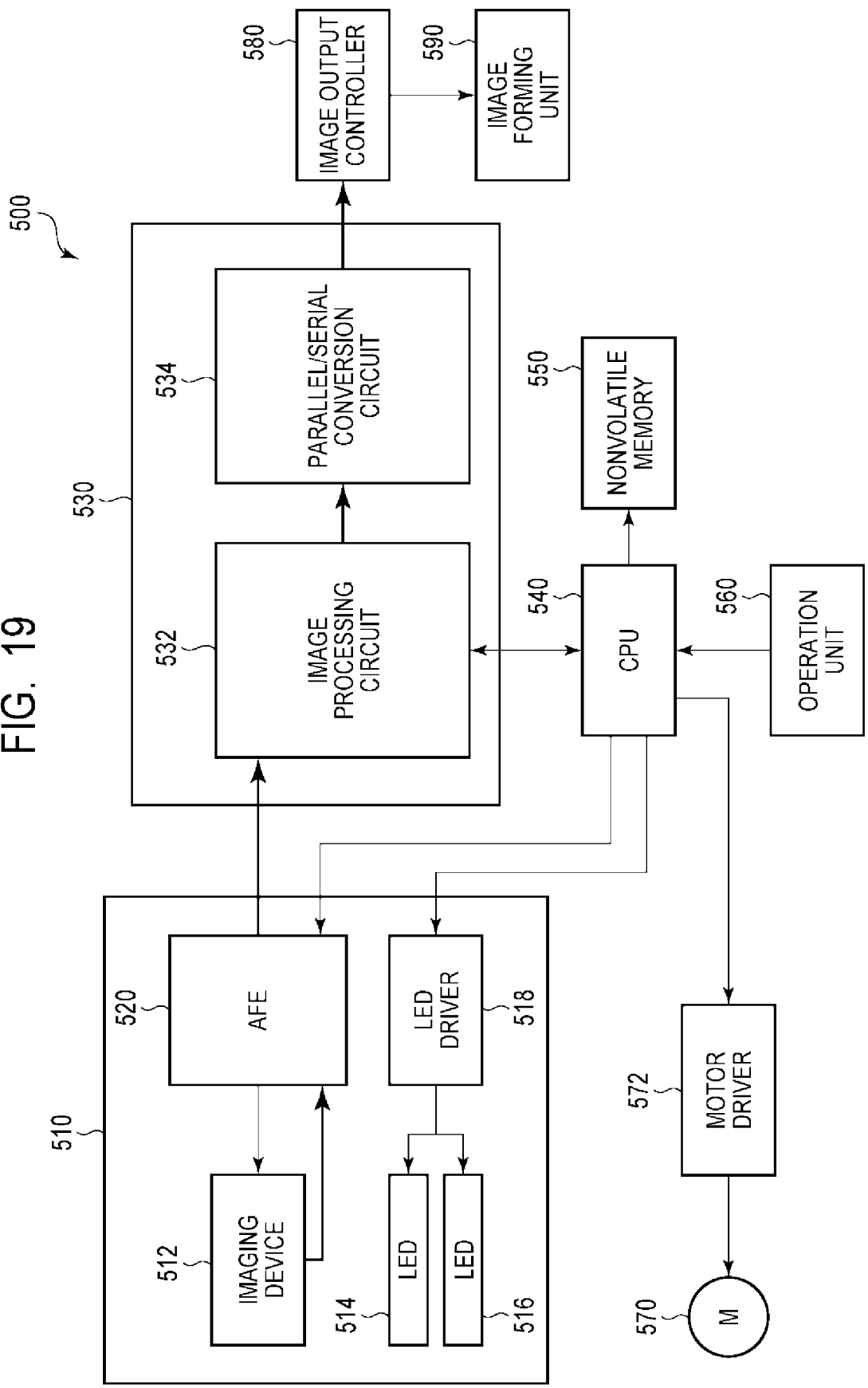
FIG. 19 is a block diagram illustrating a general configuration of an image reading apparatus according to a fifth embodiment of the present invention.

An image reading apparatus and an image forming apparatus according to a fifth embodiment of the present invention will be described with reference to FIG. 19. FIG. 19 is a block diagram illustrating a general configuration of the image reading apparatus according to the present embodiment.

In the present embodiment, a specific configuration example of the image reading apparatus and the image forming apparatus to which the imaging device described in the first to third embodiments is applied will be illustrated. The image reading apparatus and the image forming apparatus are not particularly limited and may be, for example, an image scanner, a copy machine, a multifunction printer, or the like. However, the imaging device according to the first to third embodiments is applicable to various devices including a photoelectric conversion device without being limited to the image reading apparatus and the image forming apparatus illustrated in the present embodiment.

As illustrated in FIG. 19, an image reading apparatus 500 according to the present embodiment includes a reading unit 510, an image processing unit 530, a CPU 540, a nonvolatile memory 550, an operation unit 560, a motor 570, a motor driver 572, and an image output controller 580. The reading unit 510 includes an imaging device 512, LEDs 514 and 516, an LED driver 518, and an IC 520. The image processing unit 530 includes an image processing circuit 532 and a parallel/serial converter circuit 534.

The CPU 540 reads out a control program stored in the nonvolatile memory 550 and performs the overall control of the image reading apparatus 500. The operation unit 560 is a user interface to which the user inputs setting of a copy mode such as color copy, monochrome copy, double-sided copy or instruction of start of copy.

The LED driver 518 receives a timing signal from the CPU 540 and supplies currents used for causing light emitting units, that is, white LEDs 514 and 516 to emit light. Thereby, the LEDs 514 and 516 irradiate an object for reading an image (document) with light. The imaging device 512 is the imaging device 104 described in any of the first to third embodiments, which receives light reflected from a document, converts the light into an electric signal by photoelectric conversion, and outputs an analog voltage signal in accordance with an incident light amount. The IC 520 performs analog processing such as a sample and hold process, an offset process, or a gain process on the analog voltage signal output from the imaging device 512 and converts the voltage signal subjected to the analog processing into digital data (hereinafter, luminance data). The IC 520 is referred to as Analog Front End (AFE) in general. Note that a part or all of the function of the IC 520 may be mounted in the imagine device 512.

The motor 570 moves the reading unit 510 in the sub-scanning direction. The motor driver 572 receives a timing signal from the CPU 540 and supplies an excitation current used for controlling the rotation of the motor 570.

The image processing circuit 532 performs image processing such as a shading correction process, a filtering process, or the like on read data output from the IC 520. Note that a setting of a filter or the like required for performing image processing is set in a register inside the image processing circuit 532 by the CPU 540 when powered on. The parallel/serial converter circuit 534 converts read data on which various image processing has been performed, which is output as parallel data from the image processing circuit 532, into a serial data. The read data converted into serial data is transmitted to the image output controller 580.

The read data transmitted to the image output controller 580 is transmitted to an image forming unit 590. The image forming apparatus is formed of the image reading apparatus 500 and the image forming unit 590. One example of the known image forming unit 590 may be an electrographic image forming unit. The electrographic image forming unit 590 forms an image by developing an electrostatic latent image formed on a photosensitive drum into a toner image and transcribing the toner image to a recording medium such as paper. Thereby, the image forming apparatus can form the image loaded by the image reading apparatus 500 on a recording medium by using the image forming unit.

According to the imaging device 104 of the first to third embodiments, a good quality image in which stripe noise is suppressed can be acquired. Therefore, by using the imaging device 104 of the embodiments described above, it is possible to realize an image reading apparatus that can acquire a good quality image with less noise and an image forming apparatus that is superior in color reproducibility.

Sixth Embodiment

Figure 20:
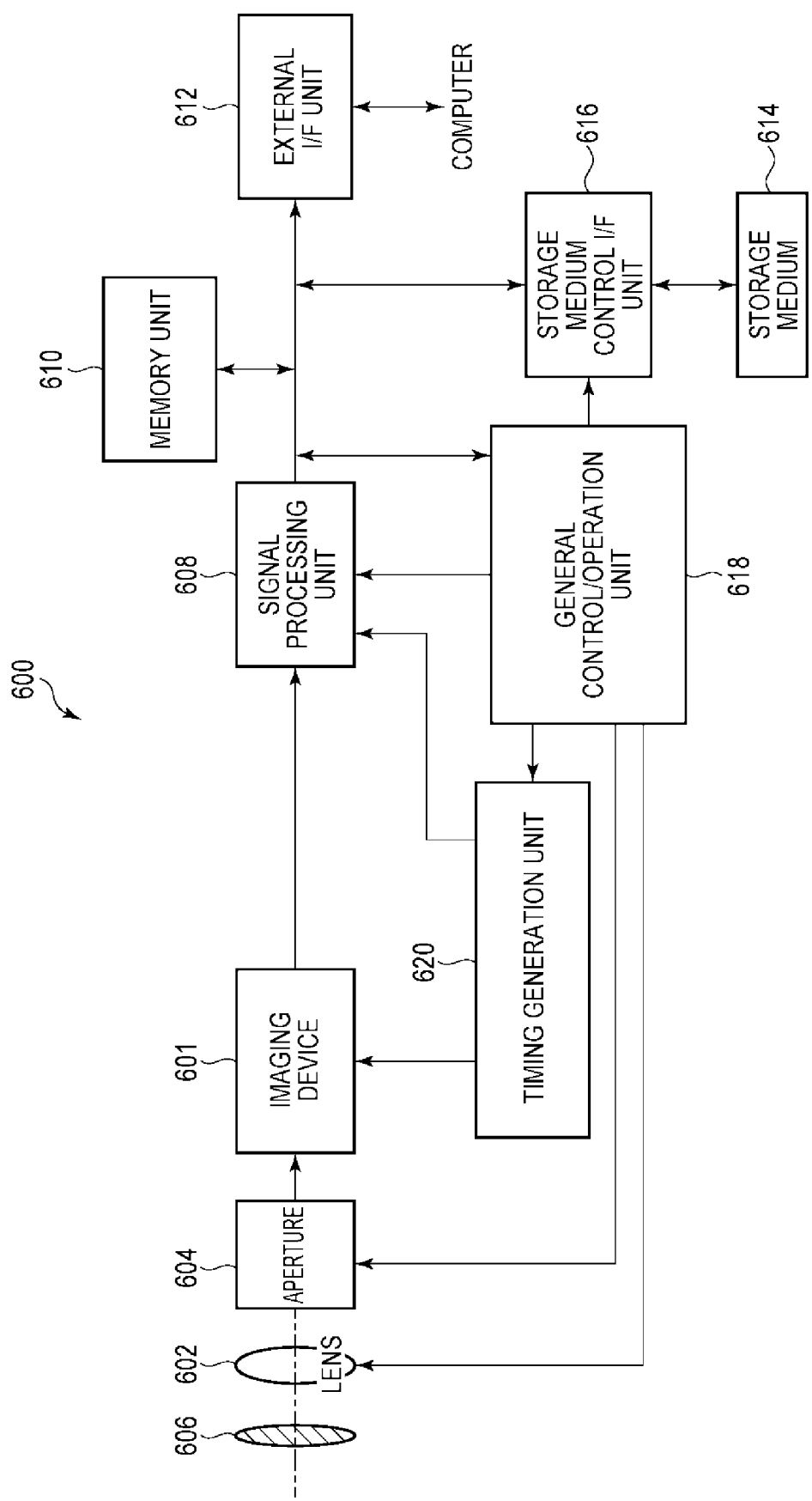
FIG. 20 is a block diagram illustrating a general configuration of an imaging system according to a sixth embodiment of the present invention.

An imaging system according to a sixth embodiment of the present invention will be described with reference to FIG. 20. FIG. 20 is a block diagram illustrating a general configuration of the imaging system according to the present embodiment.

The imaging device 200 described in the above fourth embodiment can be applied to various imaging systems. An example of applicable imaging systems may be a digital still camera, a digital camcorder, a surveillance camera, an image scanner, a copying machine, a fax machine, a mobile phone, an on-vehicle camera, an X-ray capturing device, an ultra-wide field camera, an observation satellite, or the like. Further, a camera module including an optical system such as a lens and an imaging device is also included in the imaging system. FIG. 20 illustrates a block diagram of a digital still camera as an example out of these examples.

An imaging system 600 illustrated as an example in FIG. 20 includes an imaging device 601, a lens 602 that captures an optical image of an object onto the imaging device 601, an aperture 604 for changing a light amount passing through the lens 602, and a barrier 606 for protecting the lens 602. The lens 602 and the aperture 604 form an optical system that converges a light onto the imaging device 601. The imaging device 601 is the imaging device 200 described in the fourth embodiment and converts an optical image captured by the lens 602 into image data.

The imaging system 600 further includes a signal processing unit 608 that performs processing on an output signal output from the imaging device 601. The signal processing unit 608 performs analog-to-digital (AD) conversion to converts an analog signal output by the imaging device 601 into a digital signal. Further, the signal processing unit 608 performs operations to perform various correction or compression in addition to the above, if necessary, and output image data. The AD conversion unit that is a part of the signal processing unit 608 may be formed on a semiconductor substrate on which the imaging device 601 is provided or may be provided on a different semiconductor substrate from the substrate on which the imaging device 601 is formed. Alternatively, the imaging device 601 and the signal processing unit 608 may be formed on the same semiconductor substrate.

Further, the imaging system 600 includes a memory unit 610 for temporarily storing image data therein and an external interface unit (external I/F unit) 612 for communicating with an external computer or the like. The imaging system 600 further includes a storage medium 614 such as a semiconductor memory for performing storage or readout of imaging data and a storage medium control interface unit (storage medium control I/F unit) 616 for performing storage or readout on the storage medium 614. Note that the storage medium 614 may be embedded in the imaging system 600 or may be removable.

Further, the imaging system 600 includes a general control/operation unit 618 that performs various calculation and controls the entire digital still camera and a timing generation unit 620 that outputs various timing signals to the imaging device 601 and the signal processing unit 608. Here, the timing signal or the like may be input from the outside, and the imaging system 600 may include at least the imaging device 601 and the signal processing unit 608 that processes an output signal output from the imaging device 601.

The imaging device 601 outputs an imaging signal to the signal processing unit 608. The signal processing unit 608 performs predetermined signal processing on the imaging signal output from the imaging device 601 and outputs image data. The signal processing unit 608 uses the imaging signal to generate an image.

As described above, according to the present embodiment, the imaging system to which the imaging device 200 according to the fourth embodiment is applied can be realized.

Seventh Embodiment

Figure 21A:
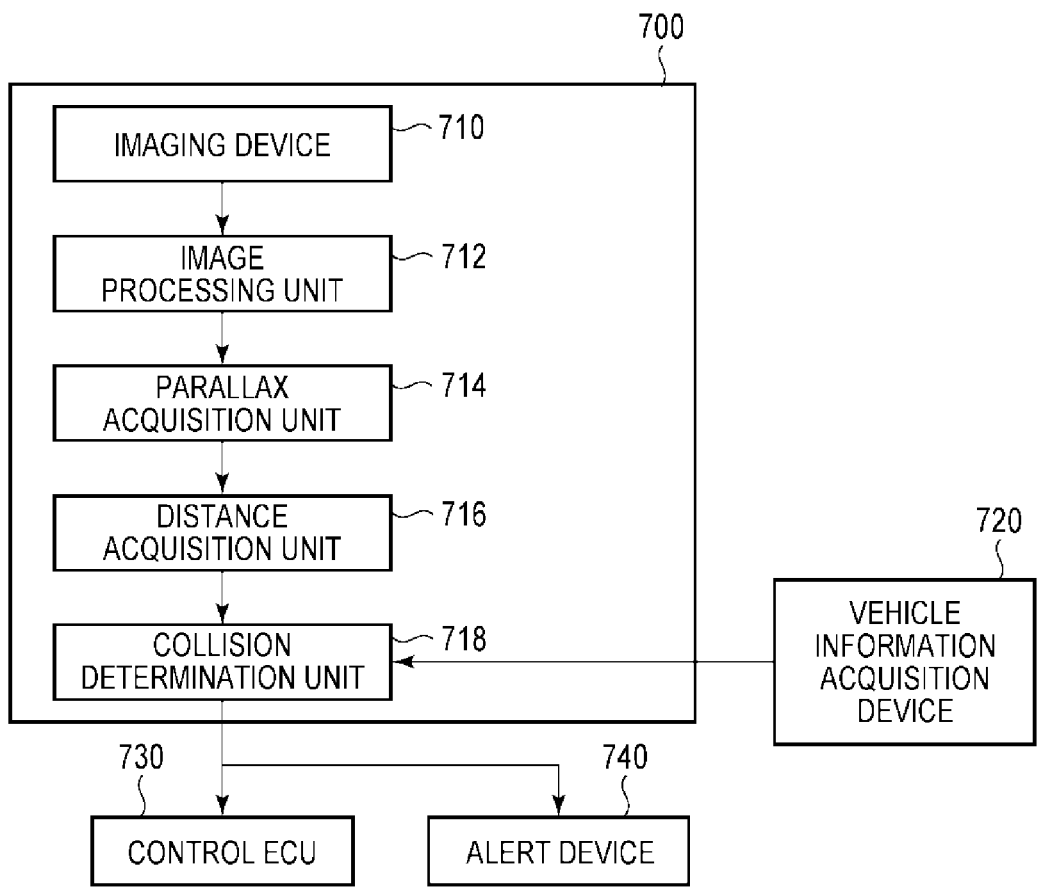
FIG. 21A is a diagram illustrating a configuration example of an imaging system according to a seventh embodiment of the present invention.
Figure 21B:
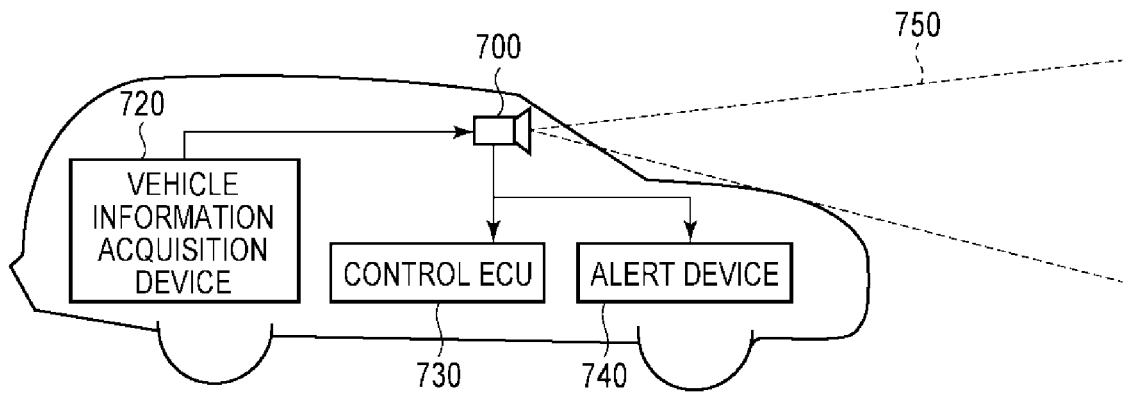
FIG. 21B is a diagram illustrating a configuration example of a movable object according to the seventh embodiment of the present invention.

An imaging system and a movable object according to a seventh embodiment of the present invention will be described with reference to FIG. 21A and FIG. 21B. FIG. 21A is a diagram illustrating a configuration of the imaging system according to the present embodiment. FIG. 21B is a diagram illustrating a configuration of the movable object according to the present embodiment.

FIG. 21A illustrates an example of an imaging system related to an on-vehicle camera. An imaging system 700 includes an imaging device 710. The imaging device 710 is the imaging device 200 described in the above fourth embodiment. The imaging system 700 includes an image processing unit 712 that performs image processing on a plurality of image data acquired by the imaging device 710 and a parallax acquisition unit 714 that calculates a parallax (a phase difference of parallax images) from the plurality of image data acquired by the imaging system 700. Further, the imaging system 700 includes a distance acquisition unit 716 that calculates a distance to the object based on the calculated parallax and a collision determination unit 718 that determines whether or not there is a collision possibility based on the calculated distance. Here, the parallax acquisition unit 714 and the distance acquisition unit 716 are an example of a distance information acquisition device that acquires distance information on the distance to the object. That is, the distance information is information on a parallax, a defocus amount, a distance to an object, or the like. The collision determination unit 718 may use any of the distance information to determine the collision possibility. The distance information acquisition device may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 700 is connected to the vehicle information acquisition device 720 and can acquire vehicle information such as a vehicle speed, a yaw rate, a steering angle, or the like. Further, the imaging system 700 is connected to a control ECU 730, which is a control device that outputs a control signal for causing a vehicle to generate braking force based on a determination result by the collision determination unit 718. Further, the imaging system 700 is also connected to an alert device 740 that issues an alert to the driver based on a determination result by the collision determination unit 718. For example, when the collision probability is high as the determination result of the collision determination unit 718, the control ECU 730 performs vehicle control to avoid a collision or reduce damage by applying a brake, pushing back an accelerator, suppressing engine power, or the like. The alert device 740 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 700. FIG. 21B illustrates the imaging system when a front area of a vehicle (a capturing area 750) is captured. The vehicle information acquisition device 720 transmits an instruction to the imaging system 700 or the imaging device 710. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, while the unit pixels 301 that output signals which do not depend on an incident light amount are two unit pixels 301*a* and 301*b* of the imaging element 105*a* in the first to third embodiments, the number of unit pixels 301 that output signals which do not depend on an incident light amount is not limited to two. Similarly, while the number of pixel columns that output signals which do not depend on an incident light amount is two in the fourth embodiment, the number of pixel columns that output signals which do not depend on an incident light amount is not limited to two.

Further, the circuit configurations of the unit pixel 301 illustrated in the first to third embodiments described above and the effective pixel 230, the optical black pixel 240, and the column circuit 260 illustrated in the fourth embodiment described above are mere examples and not limited thereto.

Further, while a device intended for acquisition of an image, that is, an imaging device has been illustrated as one example in the first to fourth embodiments described above, an application example of the present invention is not necessarily limited to an imaging device. For example, in the case of application to a device intended for ranging as described in the above seventh embodiment, it is not necessarily required to output an image. In such a case, it can be said that such a device is a photoelectric conversion device that converts optical information into a predetermined electric signal. An imaging device is one of the photoelectric conversion devices. Further, the same applies to an imaging element. An imaging element is one of the photoelectric conversion elements.

Further, the image reading apparatus and the image forming apparatus illustrated in the above fifth embodiment are examples of an image reading apparatus and an image forming apparatus to which the imaging device of the present invention may be applied. An image reading apparatus and an image forming apparatus to which the imaging device of the present invention can be applied is not limited to the configuration illustrated in FIG. 19.

Further, the imaging system illustrated in the above sixth and seventh embodiments are examples of an imaging system to which the imaging device of the present invention may be applied. The imaging system to which the imaging device of the present invention can be applied is not limited to the configurations illustrated in FIG. 20 and FIG. 21A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-229118, filed Dec. 6, 2018 which is hereby incorporated by reference herein in its entirety.

What is claimed is:

1. A photoelectric conversion element comprising a plurality of pixels arranged to receive a light and each including a photoelectric converter that generates a charge in response to incidence of a light,
wherein the plurality of pixels includes:
a first pixel configured to perform a first readout operation to read out a reset signal based on the photoelectric converter in a reset state and an optical signal based on a charge generated by the photoelectric converter; and
a second pixel that is a pixel on which a readout operation is performed at the same time as that of the first pixel and is configured to perform selectively either one of the first readout operation to read out the reset signal and the optical signal, and a second readout operation to read out the reset signal without reading out the optical signal,
wherein the photoelectric conversion element further comprises, in association with each of the plurality of pixels, a first holding unit that holds the reset signal and the optical signal and a first switch that controls writing to the first holding unit, and
wherein a control line that controls the first switch associated with the first pixel and a control line that controls the first switch associated with the second pixel are formed of separate wirings.

2. The photoelectric conversion element according to claim 1 further comprising a plurality of holding units associated with each of the plurality of pixels,
wherein signals output from the plurality of pixels are held simultaneously in parallel to the plurality of holding units.

3. The photoelectric conversion element according to claim 1 further comprising a control unit that controls the first switch,
wherein the control unit
controls the first switch of the first pixel and the first switch of the second pixel to be simultaneously turned on when reading out the reset signal from each of the plurality of pixels and holding the read out reset signal in the associated first holding unit, and controls the first switch of the first pixel to be turned on while maintaining the first switch of the second pixel to be turned off when reading out the optical signal from each of the plurality of pixels and holding the read out optical signal in the associated first holding unit.

4. The photoelectric conversion element according to claim 1,
wherein each of the plurality of pixels further includes a reset transistor that resets the photoelectric converter, and
wherein a control line that controls the reset transistor of the first pixel and a control line that controls the reset transistor of the second pixel are formed of different wirings.

5. The photoelectric conversion element according to claim 4 further comprising a control unit that controls the reset transistor of each of the plurality of pixels,
wherein the control unit controls the reset transistor of the second pixel to be selectively turned on and resets the photoelectric converter of the second pixel after simultaneously reading out reset signals from the plurality of pixels and before simultaneously reading out optical signals from the plurality of pixels.

6. The photoelectric conversion element according to claim 1 further comprising a second holding unit that holds the reset signal, a third holding unit that holds the optical signal, and a second switch that controls writing to the second holding unit, and a third switch that controls writing to the third holding unit in association with each of the plurality of pixels,
wherein a control line that controls the second switch of the first pixel and a control line that controls the second switch of the second pixel are formed of the same wiring, and
wherein a control line that controls the third switch of the first pixel and a control line that controls the third switch of the second pixel are formed of different wirings.

7. The photoelectric conversion element according to claim 6 further comprising a control unit that controls the second switch and the third switch,
wherein the control unit
controls the second switch associated with the first pixel, the second switch associated with the second pixel, and the third switch associated with the second pixel to be simultaneously turned on when reading out the reset signal from each of the plurality of pixels and holding the read out reset signal in the associated second holding unit, and
controls the third switch associated with the first pixel to be turned on while maintaining the third switch associated with the second pixel to be turned off when reading out the optical signal from each of the plurality of pixels and holding the read out optical signal in the associated third holding unit.

8. The photoelectric conversion element according to claim 6 further comprising an output unit that outputs a difference between a signal held in the second holding unit and a signal held in the third holding unit.

9. The photoelectric conversion element according to claim 1 further comprising a signal processing unit that subtracts, from a level of a signal output from the first pixel, a level of a signal output from the second pixel.

10. The photoelectric conversion element according to claim 1, wherein the plurality of pixels are aligned one-dimensionally along a first direction.

11. The photoelectric conversion element according to claim 1 further comprising a pixel array in which pixels are arranged over a plurality of rows and a plurality of columns,
wherein each of the plurality of rows is formed of the plurality of pixels, and
wherein second pixels arranged on each of the plurality of rows are arranged on the same column along an end of the pixel array.

12. The photoelectric conversion element according to claim 11, wherein the second pixels arranged on each of the plurality of rows are arranged on the same columns along both ends of the pixel array.

13. An imaging device comprising one imaging region configured with a plurality of photoelectric conversion elements according to claim 10 being arranged along the first direction.

14. The imaging device according to claim 13,
wherein out of the plurality of photoelectric conversion elements, the second pixel of one of the photoelectric conversion elements arranged at an end is configured to perform the second readout operation, and
wherein out of the plurality of photoelectric conversion elements, the second pixel of the other photoelectric conversion elements is configured to perform the first readout operation.

15. An imaging device comprising one imaging region configured with the plurality of photoelectric conversion elements according to claim 11 being arranged two-dimensionally.

16. The imaging device according to claim 15, wherein out of the second pixels, the second pixels which arranged on the same column at an end of the imaging region are configured to perform the second readout operation, and another of the second pixels are configured to perform the first readout operation.

17. The imaging device according to claim 13 further comprising a common wiring that supplies power supply voltage to the plurality of photoelectric conversion elements.

18. An image reading apparatus that reads an image of an object, the image reading apparatus comprising:
a light emitting unit that irradiates the object with a light; and
the imaging device according to claim 13 that receives a light reflected by the object and converts the received light into an electric signal.

19. A movable object comprising:
the imaging device according to claim 13;
a distance information acquisition device that acquires distance information on a distance to an object, from a parallax image based on signals from the imaging device; and
a control device that controls the movable object based on the distance information.

20. A photoelectric conversion element comprising a plurality of pixels arranged to receive a light and each including a photoelectric converter that generates a charge in response to incidence of a light,
wherein the plurality of pixels includes:
a first pixel configured to perform a first readout operation to read out a reset signal based on the photoelectric converter in a reset state and an optical signal based on a charge generated by the photoelectric converter; and a second pixel that is a pixel on which a readout operation is performed at the same time as that of the first pixel and is configured to perform selectively either one of the first readout operation to read out the reset signal and the optical signal, and a second readout operation to read out the reset signal without reading out the optical signal, wherein each of the plurality of pixels further includes a reset transistor that resets the photoelectric converter, wherein the photoelectric conversion element further comprises a control unit that controls the reset transistor of each of the plurality of pixels, and wherein the control unit controls the reset transistor of the second pixel to be selectively turned on and resets the photoelectric converter of the second pixel after simultaneously reading out reset signals from the plurality of pixels and before simultaneously reading out optical signals from the plurality of pixels.

21. A photoelectric conversion element comprising a plurality of pixels arranged to receive a light and each including a photoelectric converter that generates a charge in response to incidence of a light, wherein the plurality of pixels includes:

a first pixel configured to perform a first readout operation to read out a reset signal based on the photoelectric converter in a reset state and an optical signal based on a charge generated by the photoelectric converter; and a second pixel that is a pixel on which a readout operation is performed at the same time as that of the first pixel and is configured to perform selectively either one of the first readout operation to read out the reset signal and the optical signal, and a second readout operation to read out the reset signal without reading out the optical signal, wherein the photoelectric conversion element further comprises a first holding unit that holds the reset signal, a second holding unit that holds the optical signal, and a first switch that controls writing to the first holding unit, and a second switch that controls writing to the second holding unit in association with each of the plurality of pixels, wherein a control line that controls the first switch of the first pixel and a control line that controls the first switch of the second pixel are formed of the same wiring, and wherein a control line that controls the second switch of the first pixel and a control line that controls the second switch of the second pixel are formed of different wirings.

* * * * *